(12) United States Patent
Halford

(10) Patent No.: US 11,014,274 B2
(45) Date of Patent: May 25, 2021

(54) METHOD OF MOULDING AND MOULD TOOL

(71) Applicant: SURFACE GENERATION LIMITED, Rutland (GB)

(72) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 644 days.

(21) Appl. No.: 15/575,101

(22) PCT Filed: May 18, 2016

(86) PCT No.: PCT/GB2016/051429
§ 371 (c)(1),
(2) Date: Nov. 17, 2017

(87) PCT Pub. No.: WO2016/185203
PCT Pub. Date: Nov. 24, 2016

(65) Prior Publication Data
US 2018/0215083 A1    Aug. 2, 2018

(30) Foreign Application Priority Data
May 20, 2015 (GB) .................................... 1508655

(51) Int. Cl.
*B29C 43/58* (2006.01)
*B29C 43/04* (2006.01)
(Continued)

(52) U.S. Cl.
CPC .............. *B29C 43/58* (2013.01); *B29C 33/02* (2013.01); *B29C 33/04* (2013.01); *B29C 33/202* (2013.01);
(Continued)

(58) Field of Classification Search
None
See application file for complete search history.

(56) References Cited

U.S. PATENT DOCUMENTS 3,744,112 A * 7/1973 Lindenberg ............. H01M 2/28
29/38 R
5,066,351 A * 11/1991 Knoll ..................... B29C 43/04
156/212

(Continued)

FOREIGN PATENT DOCUMENTS

DE    102012010469 A1    11/2013
EP        0350633 A1     1/1990
(Continued)

OTHER PUBLICATIONS

English language letter dated Aug. 6, 2019 summarizing TW (R. O. C.) Office Action dated Jul. 8, 2019 in TW (R. O. C.) Patent Application 105115558.
(Continued)

*Primary Examiner* — Jacob T Minskey
*Assistant Examiner* — Caroline Montiel
(74) *Attorney, Agent, or Firm* — Young Law Firm, P.C.

(57) ABSTRACT

A method of moulding and apparatus therefor, in which a workpiece is preheated and/or post-cooled before and/or after a moulding process, allowing optimal use of the tool for high precision moulding operations.

18 Claims, 22 Drawing Sheets

(51) Int. Cl.
*B29C 43/52* (2006.01)
*B29C 33/02* (2006.01)
*B29C 33/20* (2006.01)
*B29C 33/04* (2006.01)
*B29C 43/36* (2006.01)
*B29C 35/16* (2006.01)
*B29C 33/30* (2006.01)
*B29C 35/02* (2006.01)
*B29C 43/50* (2006.01)
B29C 33/34 (2006.01)
B29C 35/04 (2006.01)
B29C 35/08 (2006.01)
B29K 105/00 (2006.01)

(52) U.S. Cl.
CPC .......... *B29C 33/305* (2013.01); *B29C 33/306* (2013.01); *B29C 35/02* (2013.01); *B29C 35/16* (2013.01); *B29C 43/04* (2013.01); *B29C 43/36* (2013.01); *B29C 43/50* (2013.01); *B29C 43/52* (2013.01); *B29C 33/34* (2013.01); *B29C 35/045* (2013.01); *B29C 2035/0283* (2013.01); *B29C 2035/046* (2013.01); *B29C 2035/0822* (2013.01); *B29C 2035/1658* (2013.01); *B29C 2035/1666* (2013.01); *B29C 2043/522* (2013.01); *B29C 2043/527* (2013.01); *B29C 2043/5816* (2013.01); *B29K 2105/253* (2013.01)

(56) References Cited

U.S. PATENT DOCUMENTS

| | | | | |
|---|---|---|---|---|
| 5,139,407 | A | 8/1992 | Kim | |
| 5,620,715 | A * | 4/1997 | Hart | B29C 51/22 264/237 |
| 5,928,597 | A * | 7/1999 | Van Ert | B29C 33/28 156/222 |
| 5,989,492 | A * | 11/1999 | Larsson | B22F 3/22 419/36 |
| 6,558,590 | B1 * | 5/2003 | Stewart | B29C 43/10 264/134 |
| 2005/0070434 | A1 * | 3/2005 | Drake | B44C 1/1712 503/227 |
| 2006/0172039 | A1 * | 8/2006 | Imai | B29C 45/0408 425/595 |
| 2008/0113056 | A1 | 5/2008 | Schnurr | |
| 2009/0240342 | A1 * | 9/2009 | Lindh, Sr. | B29C 43/003 623/23.72 |
| 2013/0285288 | A1 | 10/2013 | Parmigiani | |
| 2015/0021326 | A1 * | 1/2015 | Giraud | B65D 83/0409 220/254.1 |
| 2016/0207239 | A1 * | 7/2016 | Halford | B29C 45/4005 |

FOREIGN PATENT DOCUMENTS

| | | | |
|---|---|---|---|
| EP | 0420098 A2 | 3/1991 | |
| EP | 0420098 A2 | 4/1991 | |
| EP | 1004422 A1 | 5/2000 | |
| FR | 2779988 A1 * | 12/1999 | ............. B29C 70/44 |
| FR | 2779988 A1 | 12/1999 | |
| FR | 2779988 B1 | 12/1999 | |
| FR | 2779988 B1 | 7/2000 | |
| WO | 03011550 A1 | 2/2003 | |
| WO | 2011048365 A1 | 4/2011 | |
| WO | 2013021195 A1 | 2/2013 | |
| WO | 2013034892 A1 | 3/2013 | |
| WO | 2014135858 A1 | 9/2014 | |
| WO | 2015025138 A1 | 2/2015 | |

OTHER PUBLICATIONS

International Search Report and Written Opinion of International Searching Authority in PCT/GB2016/051429, dated Oct. 5, 2016.
Search Report Under Section 17(5) in GB1508655.6, dated Nov. 4, 2015.
TW Examination and Search Report dated Feb. 13, 2020 in TW Patent Application 105115558 and English-language letter dated Mar. 3, 2020 summarizing content thereof.
English translation of CN Office Action of Dec. 6, 2019 in CN Application 201680029254.3.
EPO Examination Report dated Mar. 11, 2019 in EP Application No. 14725207.1-1014.
CN Office Action of May 17, 2019 in CN Appln No. 201680029254.3.

* cited by examiner

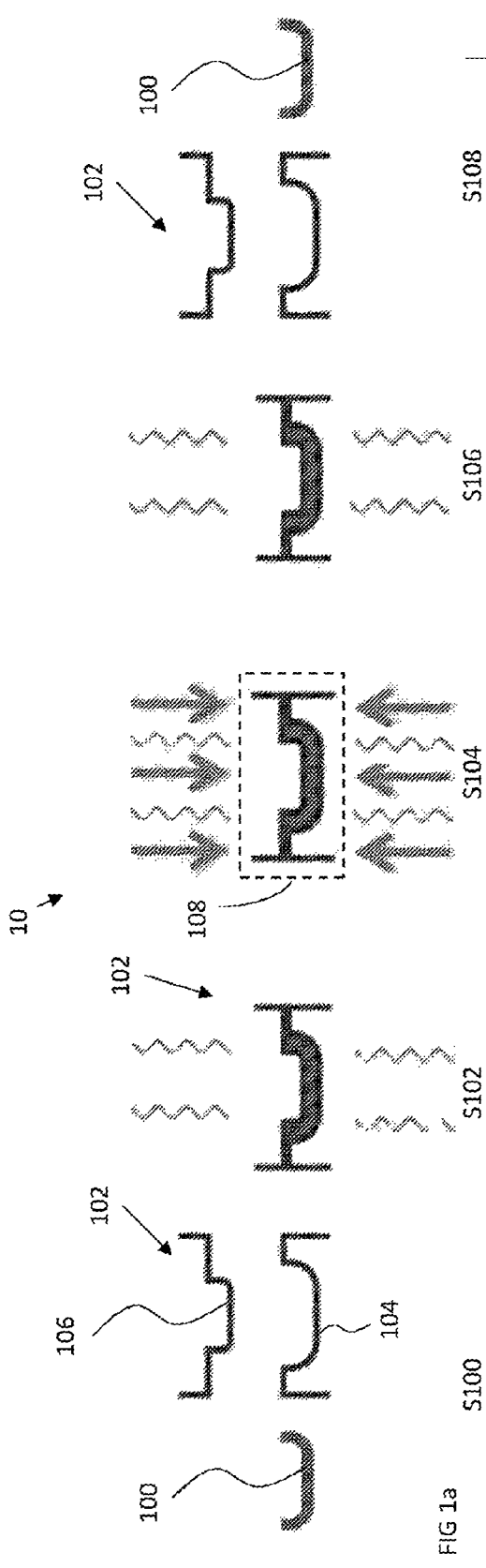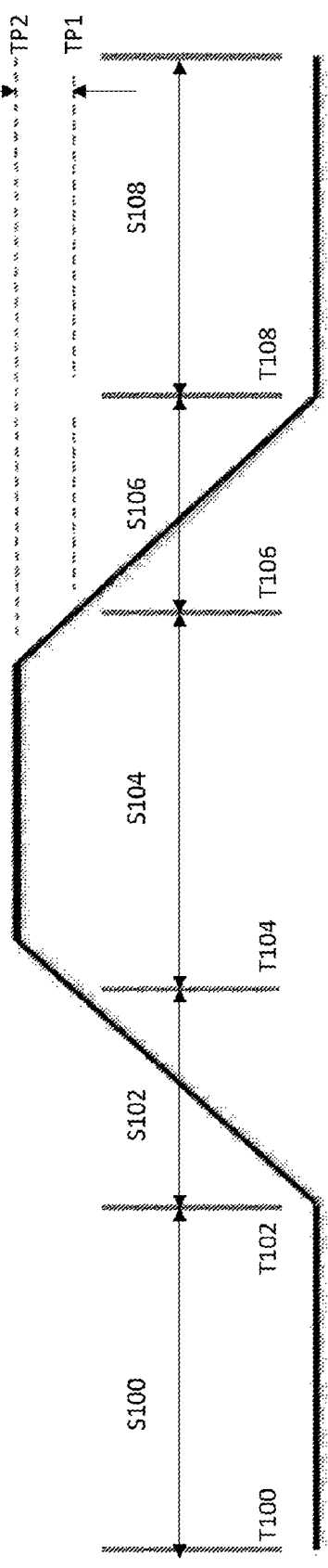

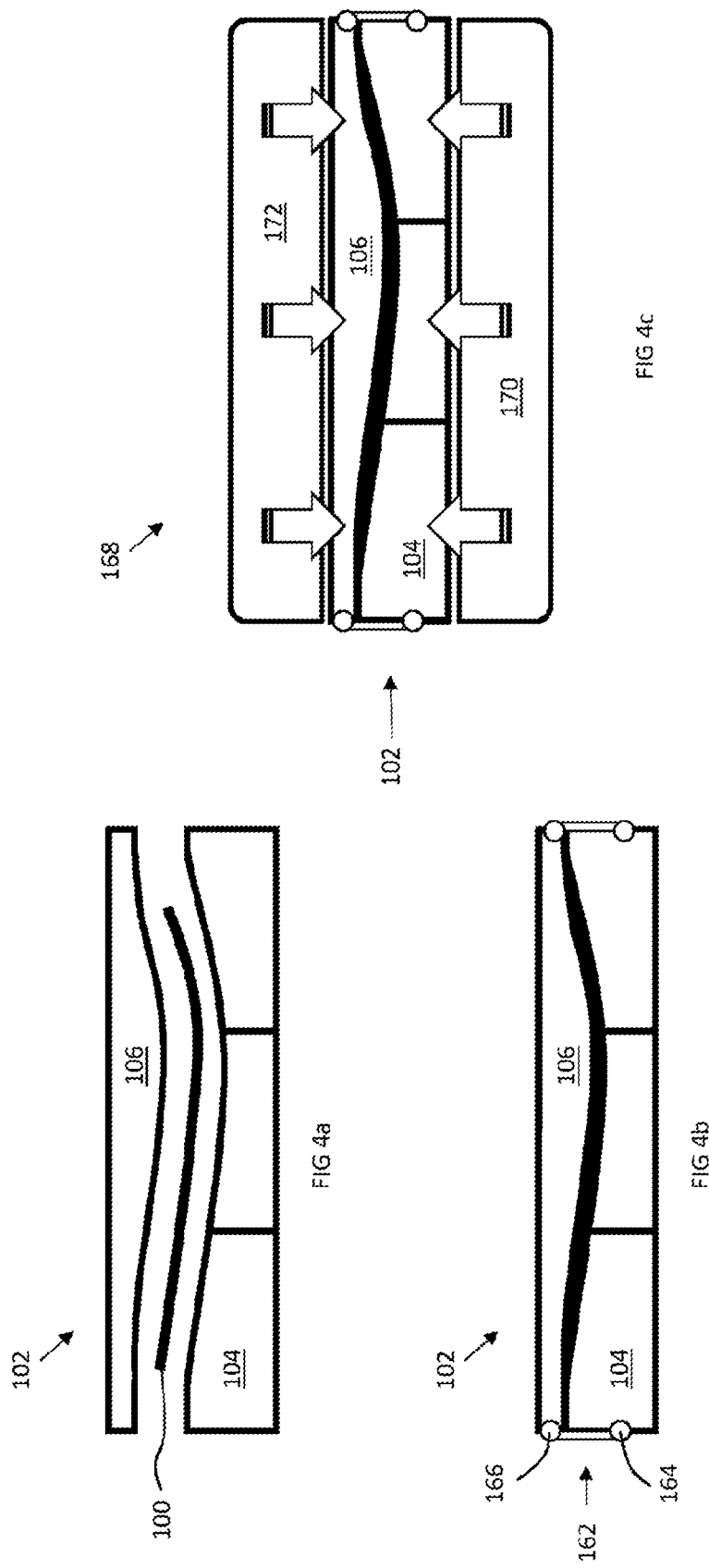

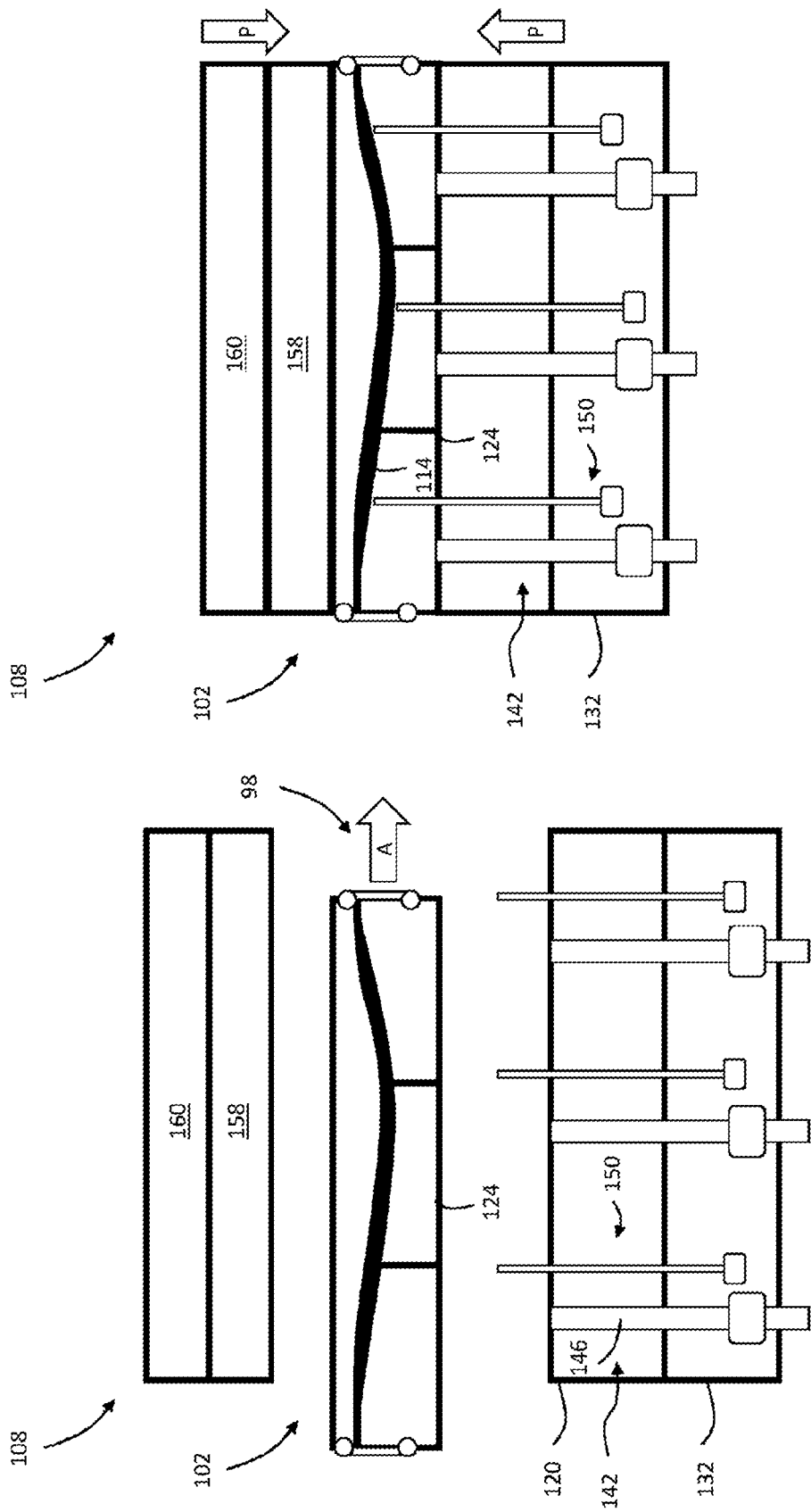

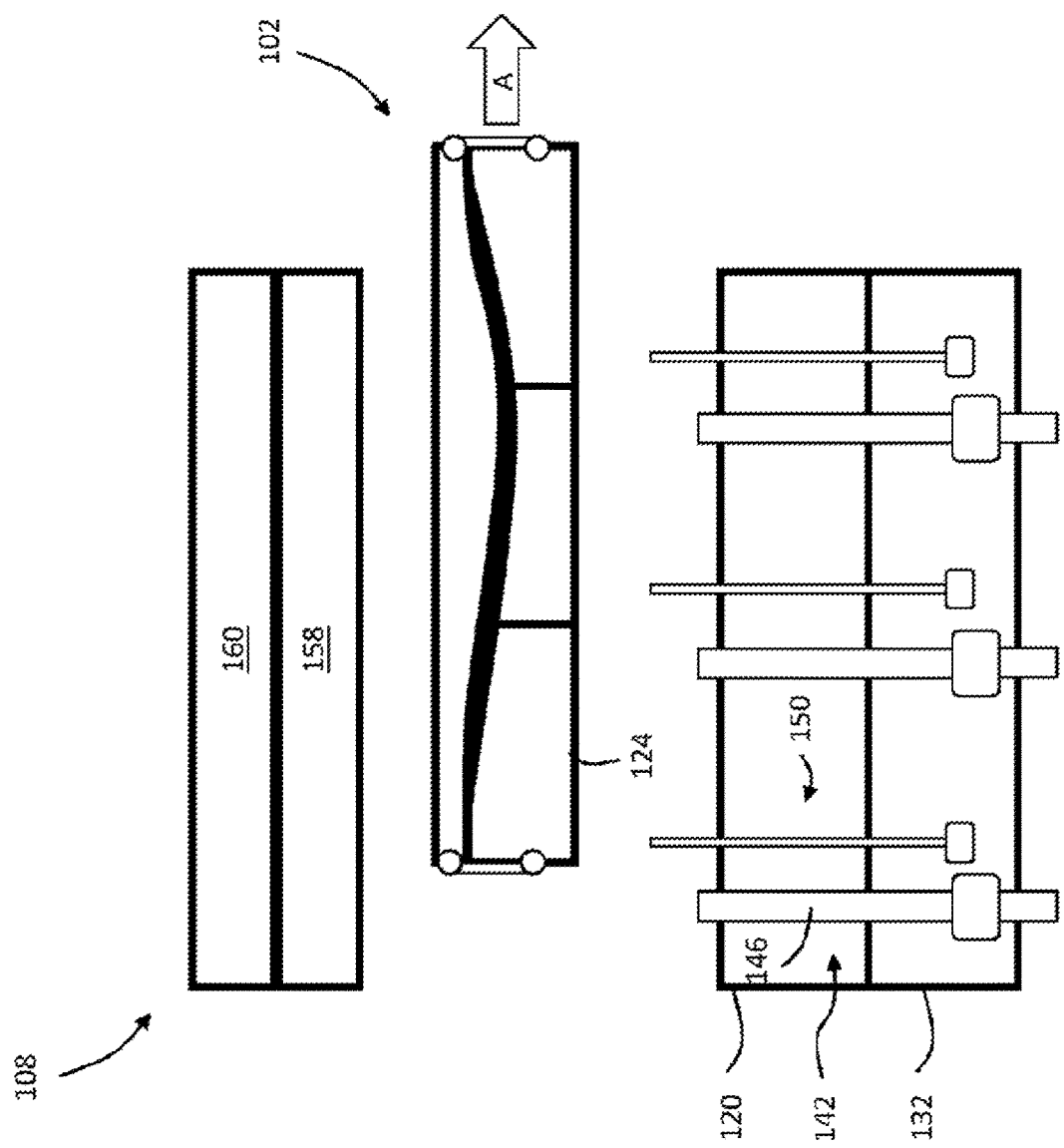

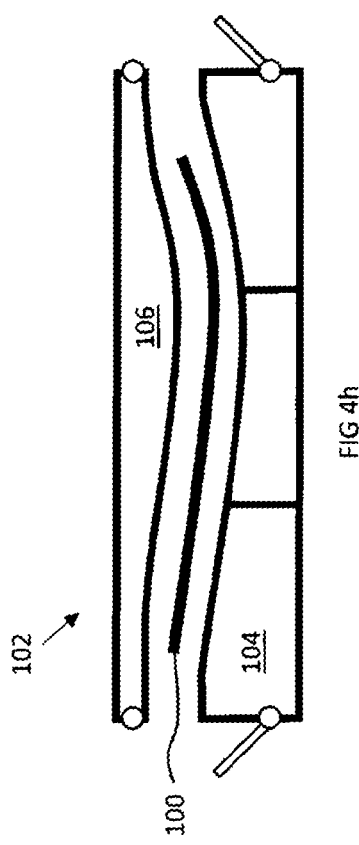
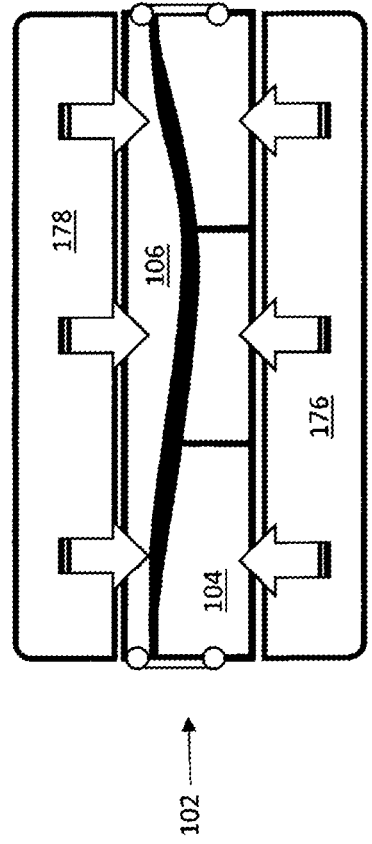

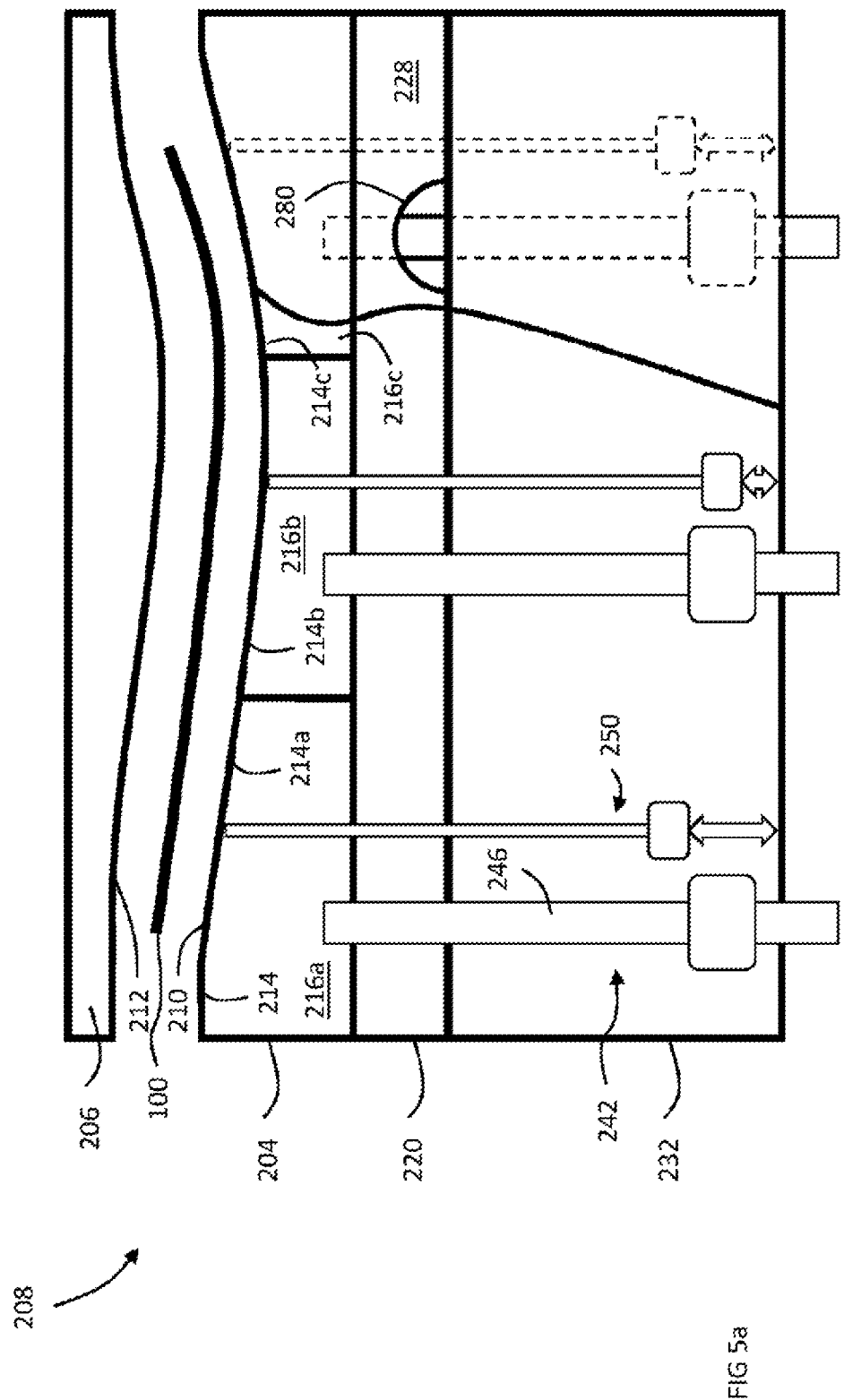

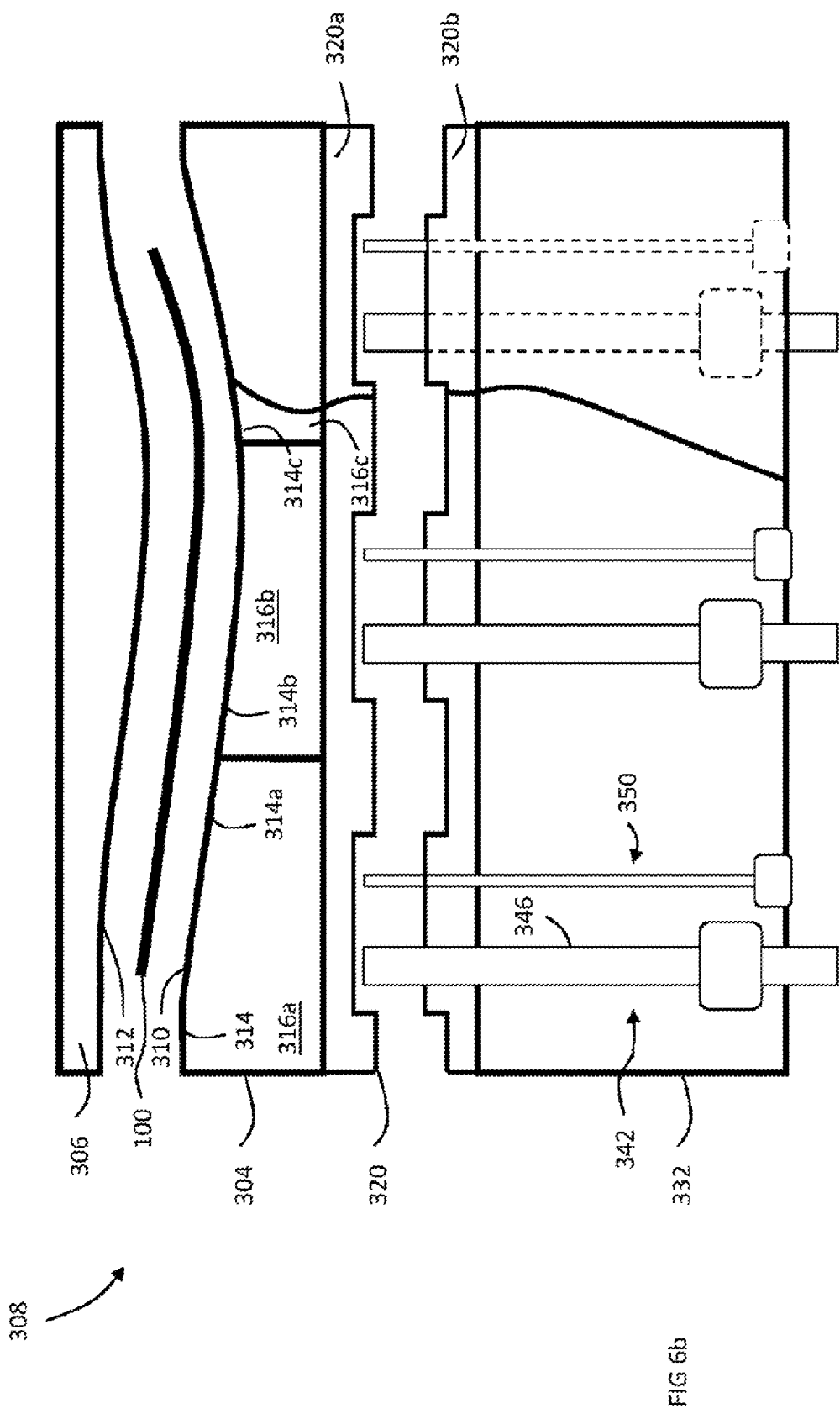

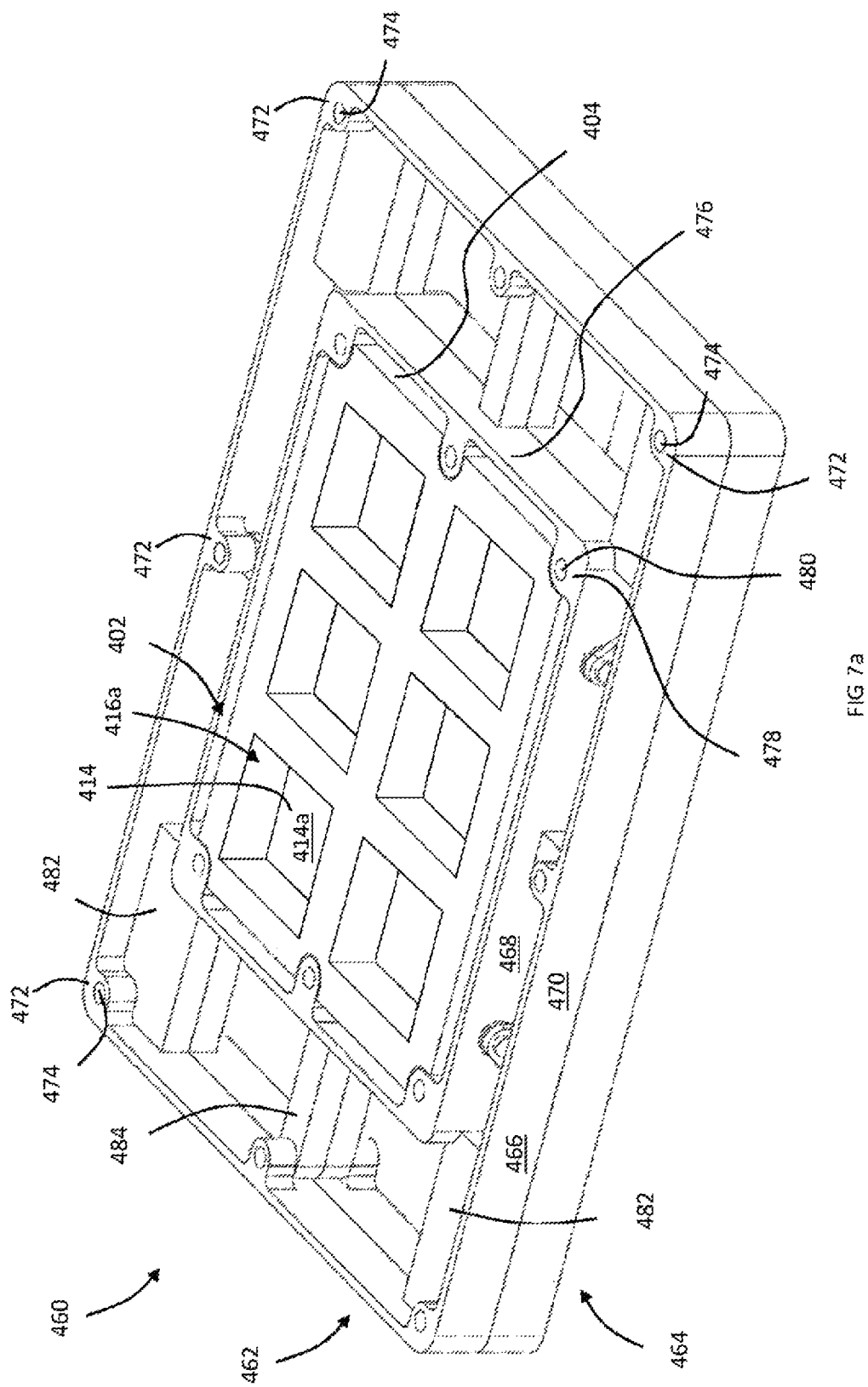

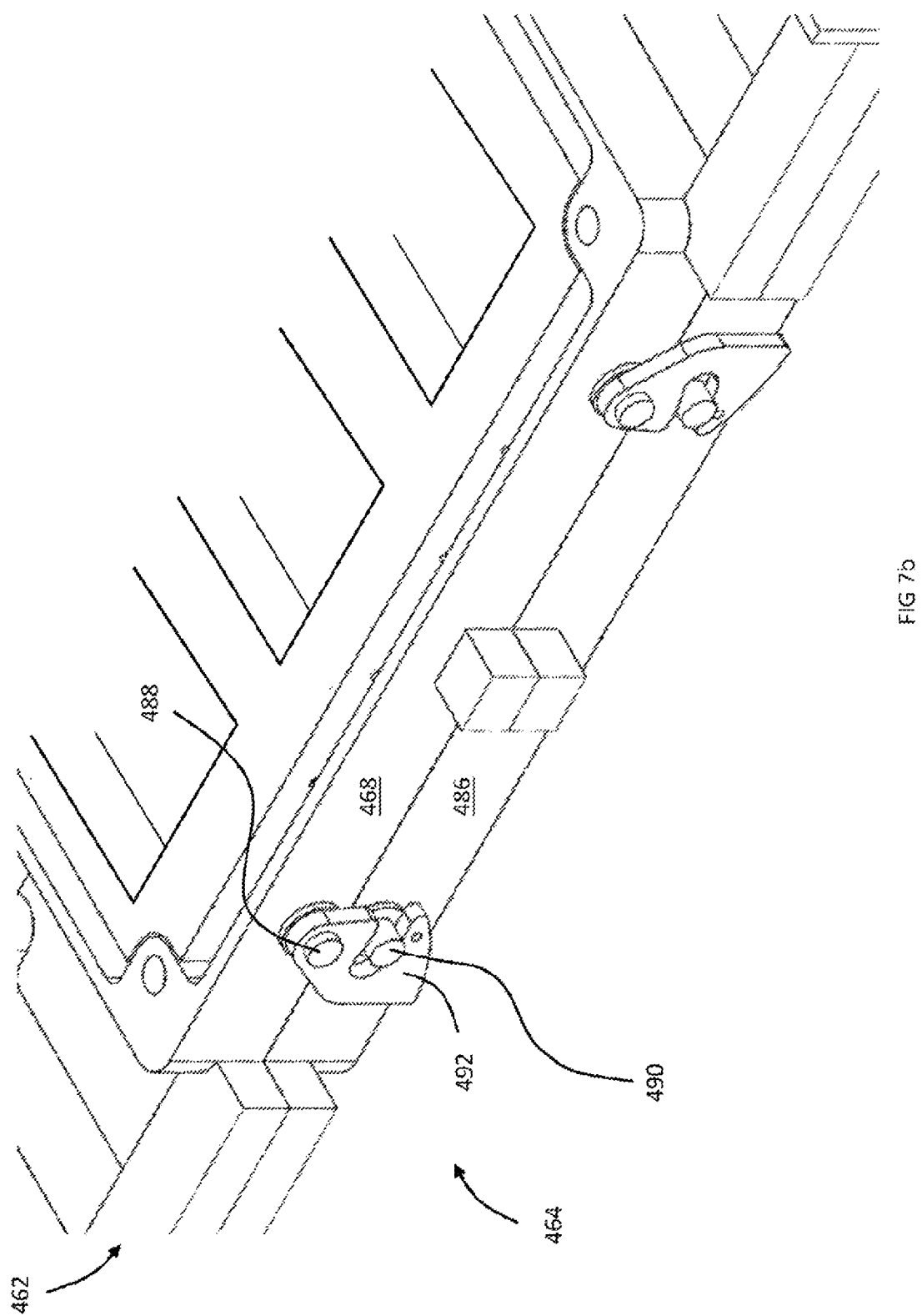

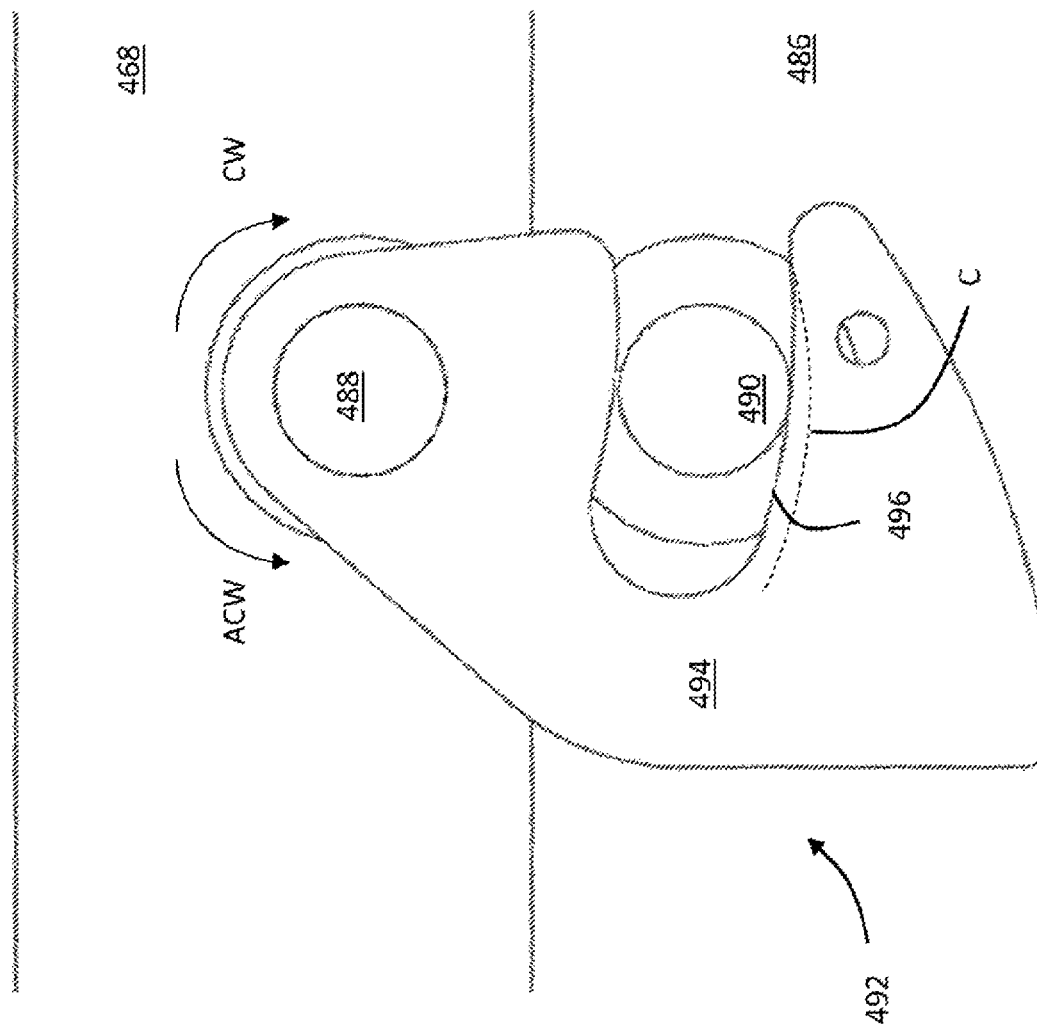

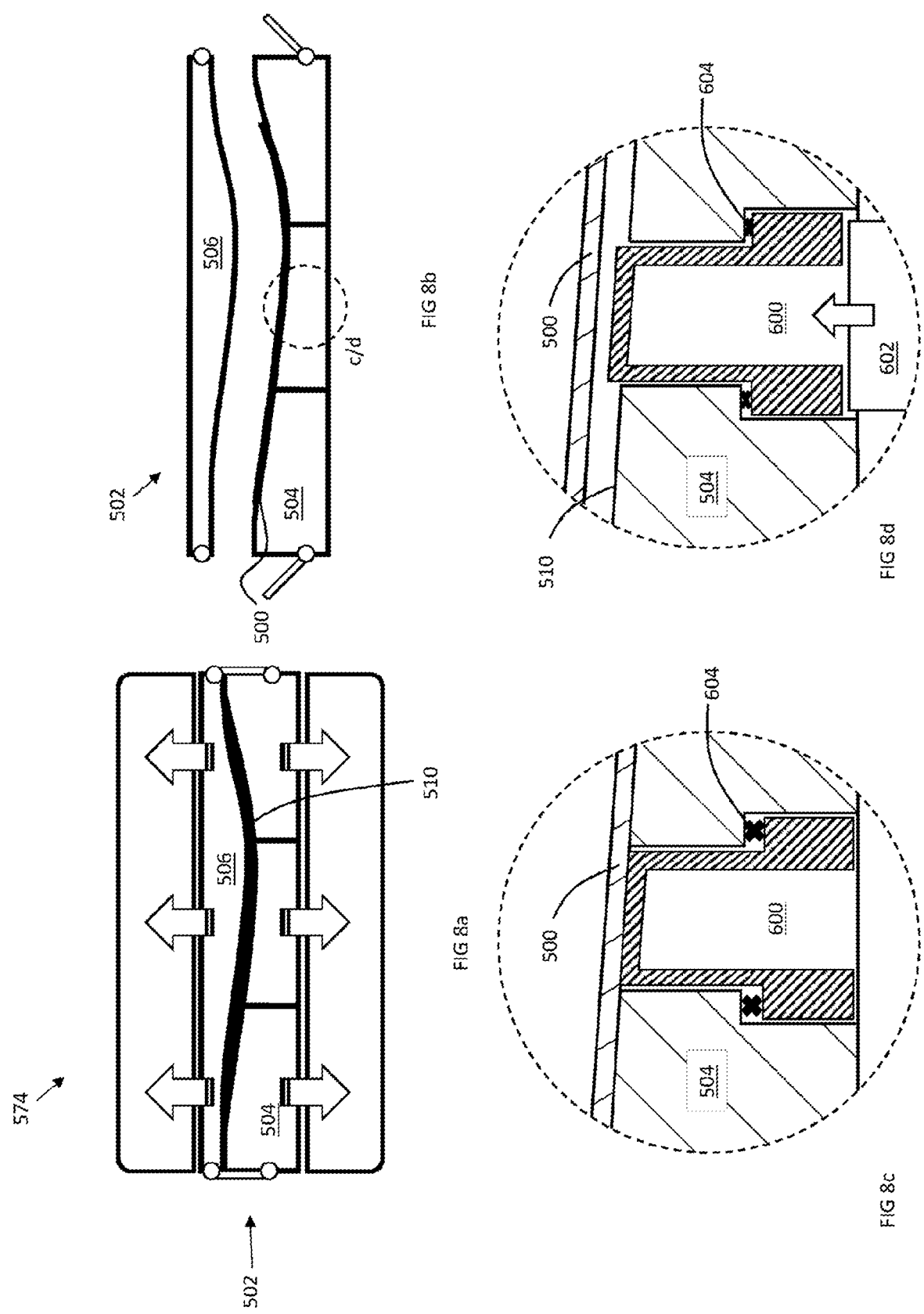

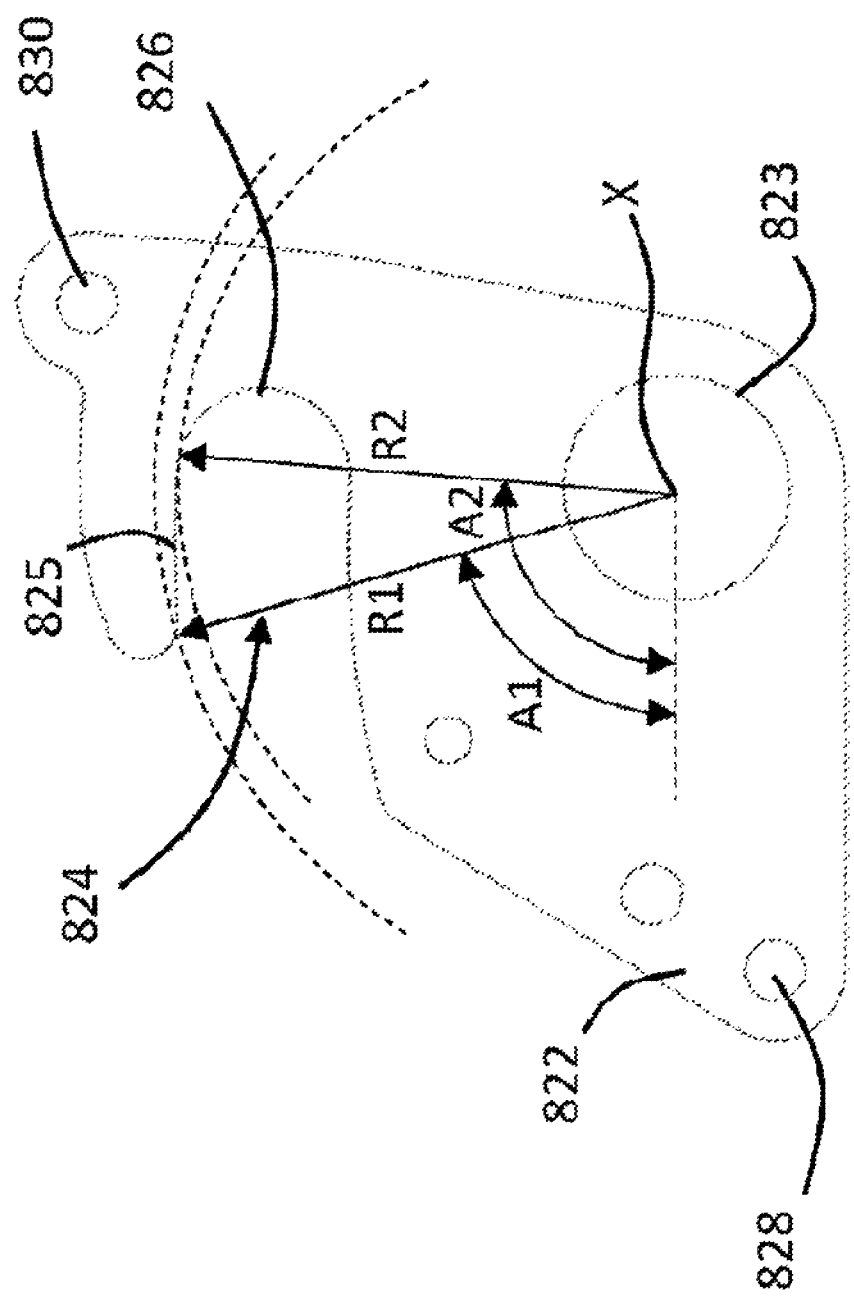

METHOD OF MOULDING AND MOULD TOOL

BACKGROUND

The present invention is concerned with a mould tool, and an associated method of moulding a workpiece. More specifically, the present invention is concerned with a mould tool having a removable mould layer which can be heated and/or cooled outside the main moulding process, and an associated method.

Mould tools are well known in the art, and provide selective application of heat and pressure to material (plastic, composite or metallic) inside a mould profile to form a workpiece. Some known tools have the ability to vary temperature across the mould surface to closely control this process. Such a mould tool is disclosed in the applicant's earlier applications published as WO 2011/048365, and WO 2013/021195. In both cases, the mould surfaces of the tools are separated into a discrete number of tessellated tool zones. Each zone can be individually heated or cooled by a heating/cooling means, and as such the resulting material properties of the workpiece can be closely controlled across the tool. For example, workpieces of varying thickness can be produced without significant variation in residual stresses which might otherwise cause e.g. spring-back.

In WO 2013/021195, the mould tool comprises a series of layers, typically including:
- a mould layer defining the mould surface and a temperature control surface against which hot or cool fluid can be directed to heat or cool the zone;
- an exhaust layer for exhausting the spent heating/cooling fluid; and,
- a utilities layer for housing the control and heating/cooling means.

The layers are insulated from one another. This means that the mould layer can remain "thermally agile"—i.e. having low thermal mass in order for the temperature to be quickly adjusted with the minimum transfer of thermal energy. The layered tool also allows facilitated the maintenance of a low temperature in the utilities layer to protect the delicate electronics therein.

In use, a material (such as a pre-preg composite green body) is placed between two opposing mould layers (on opposite sides of the tool) and enclosed. Pressure is applied to the mould layer (typically in the order of MPa). The mould layer, under pressure, is heated and cooled according to a desired profile and subsequently removed once the desired properties have been obtained. The entire curing/solidification process is carried out in the mould tool.

The mould tool of WO 2013/021195 is particularly complex, having a plurality of heating and cooling apparatuses and control systems to control the moulding process. Such tools can have many tens of computer controlled zones. As such, capital expenditure for a single unit is relatively high (compared to a much simpler autoclave based tool).

As such, it is desirable to minimise the amount of time a given workpiece spends in the mould tool to maximise the user's capital expenditure on the tool. What are needed, therefore, are devices.

SUMMARY

According to a first aspect of the present invention there is provided method of manufacturing a moulded workpiece comprising the steps of:

- providing a mould tool having a temperature control system configured to selectively control the temperature of a plurality of adjacent mould tool zones on a mould surface;
- providing a mould layer assembly defining a mould cavity at least partially bounded by a mould surface, which mould layer assembly is separable from the mould tool;
- introducing material to be moulded into the mould layer assembly;
- using the temperature control system to undertake part of a moulding operation by selectively controlling the temperature of a plurality of adjacent mould tool zones on the mould surface of the mould layer assembly; and,
- removing the moulded workpiece from the mould layer assembly;
- wherein the method comprises one or more of a pre-heating stage and a post-cooling stage in which;
  - the pre-heating stage comprises the steps of pre-heating the mould layer assembly outside the mould tool before inserting the first mould layer assembly into the mould tool; and,
  - the post-cooling stage comprises the steps of removing the mould layer from the mould tool and cooling the mould layer assembly outside the mould tool.

In other words, according to a first embodiment, there is provided a method of manufacturing a moulded workpiece comprising the steps of:

- providing a mould tool having a temperature control system configured to selectively control the temperature of a plurality of adjacent mould tool zones on a mould surface;
- providing a mould layer assembly defining a mould cavity at least partially bounded by a mould surface;
- introducing material to be moulded into the mould layer assembly when the mould layer assembly is outside the mould tool;
- pre-heating the mould layer assembly outside the mould tool;
- inserting the first mould layer into the mould tool;
- using the temperature control system to undertake part of a moulding operation by selectively controlling the temperature of a plurality of adjacent mould tool zones on the mould surface of the mould layer assembly; and,
- removing the moulded workpiece from the mould layer assembly.

According to a second embodiment, there is provided a method of manufacturing a moulded workpiece comprising the steps of:

- providing a mould tool having a temperature control system configured to selectively control the temperature of a plurality of adjacent mould tool zones on a mould surface;
- providing a mould layer assembly defining a mould cavity at least partially bounded by a mould surface;
- introducing material to be moulded into the mould layer assembly when the mould layer assembly is outside the mould tool;
- using the temperature control system to undertake part of a moulding operation by selectively controlling the temperature of a plurality of adjacent mould tool zones on the mould surface of the mould layer assembly
- removing the first mould layer from the mould tool;
- cooling the mould layer assembly outside the mould tool;
- removing the moulded workpiece from the mould layer assembly.

Preferably, the method comprises both pre-heating and post-cooling stages.

Advantageously, by undertaking a pre-heating and/or post-cooling stage, use of the mould tool and the complex, expensive temperature control system is minimised. Fine control of the temperature of the workpiece with the temperature control systems is only essential throughout part of the process—that is once the overall temperature of the material has reached a predetermined level (and before final cooling). During "pre-heating" and "post-cooling" phases, the temperature control assemblies do not need to provide the fine control they are capable of—they are merely heating the tool in a homogenous manner. Evidently, the full capability of the tool (i.e. fine temperature control) is not being used in these phases. Advantageously, the present invention proposes undertaking these phases outside of the complex tool. In this manner, in a production line, a first workpiece can be undergoing a cooling phase, whilst a second undergoes find control and a third a pre-heating phase, all simultaneously whilst using only a single mould tool. In the prior art, three mould tools would be required to achieve this.

Preferably the temperature control system comprises a plurality of temperature control apparatuses arranged to control the temperature of the plurality of independent temperature controlled zones of a mould surface.

Preferably the method comprises the step of, after the step of inserting the first mould layer into the mould tool:

advancing the plurality of temperature control apparatuses towards the mould layer assembly before undertaking the moulding operation.

Alternatively, or in addition, there is provided the step of, after the step of undertaking part of a moulding operation:

retracting the plurality of temperature control apparatuses away from the mould layer assembly before removing the first mould layer assembly.

Preferably the plurality of temperature control assemblies are movable towards and away from the first mould layer in a first direction, and in which the mould layer assembly is insertable and removable in a second direction perpendicular to the first.

In prior art mould tools, and in particular for fluid heating and cooling, the fluid outlets of the temperature control assemblies are nested within the mould layer (that is, close to the back face of the mould) for maximum effectiveness. Evidently, this is incompatible with a mould layer which needs to be easily removed in a sideways direction (i.e. without having to open the tool too far). The present invention overcomes this problem by retracting the temperature control assemblies to allow insertion and removal of the mould layer(s).

Preferably, the mould tool comprises a utilities layer, in which the plurality of temperature control assemblies are mounted to the utilities layer. More preferably, the steps of moving the plurality of temperature control assemblies comprises moving the utilities layer. This allows for all of the assemblies to be moved as one, and simplifies the process.

Preferably the mould tool comprises an intermediate layer between the utilities layer and the mould layer assembly. The intermediate layer may be removable with the mould layer assembly, or may remain in the tool to support the mould layer assembly during advancement of the utilities layer.

Preferably the intermediate layer is an exhaust layer, arranged to direct heating and cooling fluid away from the mould layer assembly during the step of undertaking the moulding operation. Preferably the fluid is a gas, more preferably it is air.

Preferably the mould layer assembly comprises a first mould layer and a second mould layer together defining the mould cavity, and the method comprises the steps of applying a preload to the mould layer assembly to exert an out-of-mould pressure on the workpiece. More preferably a moulding pressure is applied during the moulding operation, which moulding pressure is greater than the out-of-mould pressure. In order to facilitate transfer of the mould layer assembly from e.g. the pre-heating station to mould tool, there is preferably provided a clamping mechanism is arranged to retain at least part of a pressure exerted on the mould layer assembly.

Preferably a cassette is provided in which the mould layer assembly is removably mounted. Preferably the mould layer assembly is transported using the cassette. In other words, transit forces are applied to the cassette rather than the mould tool assembly. For example, the cassette may engage with a chain system to move the cassette between loading, pre-heating, moulding, post-cooling and de-moulding stations. Preferably the cassette surrounds the mould layer assembly to protect it. More preferably the cassette surrounds the mould layer assembly around its outer edge.

Preferably a part of the temperature control apparatuses are in contact with the mould layer assembly during the moulding operation. More preferably, that part of the temperature control apparatuses in contact with the mould layer assembly are resiliently biased into contact with the mould layer assembly. This allows the mould tool to adapt to new mould geometries.

The part of the temperature control apparatuses in contact with the mould layer assembly may be a temperature sensor, or a fluid heater assembly. Temperature sensors often need to contact the back face of the mould. The provision of resilient (e.g. sprung) mounting allows a range of tool geometries to be introduced, and as such part variability between operations can be maximised.

Preferably the step of pre-heating comprises the step of evenly heating the mould layer assembly to a substantially even temperature across the mould surface. This is simple, and inexpensive compared to running the complex mould tool in a homogenous manner. This may be achieved by a number of means, for example radiant heating using infrared lamps. Radiant heating is advantageous as it does not require close contact with the mould tool assembly. Therefore the mould tool assembly can be moved into position proximate a source of radiant heat without needed to advance or retract the source itself.

The mould layer assembly preferably comprises a series of fluid chambers opposite the mould surface/cavity, the chambers defining the temperature controlled zones during moulding. It will be noted that the mould layer assembly may be pre-heated with fluid passed into the fluid chambers. This takes advantage of the inherent nature of the mould layer during pre-heating. Preferably the step of cooling comprises the step of evenly cooling the first mould layer to a substantially even temperature across the mould surface. This may be achieved, for example, using fans producing an ambient airflow impinging on the mould layer assembly.

The clamps allow the out-of-mould pressure to be maintained after the moulding operation, and indeed the pressure may be maintained during pre-heating and during cooling.

According to a second aspect of the invention there is provided a mould tool comprising:

a mould layer assembly defining a mould cavity at least partially bounded by a mould surface for moulding a workpiece, the mould surface being separated into a plurality of independent temperature controlled zones;

a plurality of temperature control apparatuses configured to selectively control the temperature of each of the zones of the mould surface;

wherein the mould layer assembly is separable from the mould tool for pre-heating and/or post cooling Advantageously, providing a separable mould layer assembly, allows the start and/or end of the moulding process to be carried out off-line (that is, outside the tool). This maximises the use of the tool for the middle "fine control" part of the moulding process.

Preferably the plurality of temperature control apparatuses are retractable away from the mould layer assembly to allow insertion and removal thereof. More preferably the plurality of temperature control apparatuses are retractable away from the mould layer assembly in a first direction to allow insertion and removal of the mould layer assembly in a second direction, perpendicular to the first. The mould tool is configured to exert a moulding force on the mould layer assembly during a moulding operation, and the first direction is the direction of the moulding force.

Preferably the plurality of temperature control apparatuses are mounted to a utilities layer comprising electrics and/or electronics for power and/or control. More preferably the utilities layer is movable away from the mould layer assembly to retract the plurality of temperature control apparatuses. This allows for easier actuation.

Preferably the mould tool comprises an intermediate layer between the mould layer assembly and the utilities layer, which intermediate layer is configured to support the mould layer assembly during movement of the plurality of temperature control apparatuses.

The intermediate layer may be an exhaust layer configured to direct heating and cooling fluid from the mould layer assembly during a moulding operation.

Preferably the plurality of temperature control apparatuses each comprise a fluid conduit directed onto the mould layer assembly to heat and/or cool the zones. More preferably the first mould layer comprises a plurality of fluid chambers corresponding to the temperature controlled zones, and the fluid conduits exit towards respective cavities of the first mould layer.

Preferably a part of the temperature control apparatuses is in contact with the mould layer assembly during the moulding operation. The part may be resiliently biased into contact with the mould layer assembly to account for variable mould geometry. This part may be a temperature sensor or a fluid heater assembly.

Preferably the mould layer assembly comprises a first mould layer and a second mould layer, in which the first mould layer and the second mould layer define the mould cavity therebetween.

According to a third aspect of the invention there is provided a mould layer assembly for insertion into a mould comprising:

a first mould layer defining a first mould surface; and, a second mould layer defining a second mould surface opposite the first to define a mould cavity;

in which at least the first mould layer comprises a series of fluid chambers opposite the first mould surface, which fluid chambers define a plurality of tessellating zones.

Preferably the tool or assembly comprises a catch, in which the first and second mould layers are held in contact during transit by the catch. The catch may be a variable catch configured to at least partially maintain an applied clamping force between the first and second mould layers. Therefore it may be biased towards a fully latched position. Preferably the catch is a rotatably mounted catch having a mouth for receiving a pin.

The mould assembly may be carried by a carrier configured to carry the first and second mould layers in transit. Advantageously, the properties of the mould tool can thereby be maximised for moulding (thin walled for thermal agility, low thermal expansion coefficient etc.) whilst the carrier can be designed for transit (bulky, strong etc.).

The carrier typically comprises a first carrier part supporting the first mould layer, and a second carrier part supporting the second layer. Preferably the first and second mould carriers are held in contact during transit by a catch. This way the mould tools don't need to be structurally modified to carry a catch.

Preferably one of the mould layers carries an integral ejection pin for ejecting a workpiece. Preferably the ejection pin forms part of the mould surface of the layer. More preferably the ejection pin is resiliently biased into a position where it is flush with the mould surface of the layer. Alternatively a pneumatic ejection system may be provided to eject the workpiece with a blast of air.

According to a fourth aspect of the invention, there is provided a manufacturing system comprising:

a mould tool according to the third aspect;

at least one of a pre-heating and/or post-cooling station;

a plurality of mould layer assemblies according to the fourth aspect;

an automated transit system between the at least one of a pre-heating and/or post-cooling station and the mould tool to transport the mould layer assemblies.

Preferably the mould tool assemblies can be simultaneously:

moulded using the mould tool; and pre-heated or post-cooled using the at least one of a pre-heating and/or post-cooling station.

Preferably the system comprises a plurality of pre-heating and/or post-cooling stations for each mould tool.

Preferably the mould layer assemblies are carried in cassettes, which cassettes are carried by the transit system.

Preferably the mould layer assemblies comprise clamps configured to retain at least part of a clamping force on the mould layer subassemblies during transit.

BRIEF DESCRIPTION OF THE DRAWINGS

A method and apparatus according to the present invention will now be described with reference to the accompanying figures, in which:

FIG. 1a is a schematic diagram of a first method in accordance with the present invention;

FIG. 1b is a schematic graph of the temperature of the workpiece of FIG. 1a;

FIGS. 4a to 4h show the mould tool of FIG. 3 in various stages of the method of FIG. 1a;

FIGS. 5a and 5b show a second mould tool in accordance with the invention;

FIGS. 6a and 6b show a second mould tool in accordance with the invention;

FIGS. 7a to 7c show a part of a third mould tool in accordance with the present invention;

FIGS. 8a to 8d show a part of a fourth mould tool in accordance with the present invention;

FIG. 9c shows a plan view of the part of FIG. 9a;

FIG. 9d shows a side view of the part of FIG. 9a;

FIG. 9e shows an exploded view of the part of FIG. 9a;

FIG. 9f is a detail view of a part of the mould tool of FIG. 9a; and,

DETAILED DESCRIPTION

Figure 2:
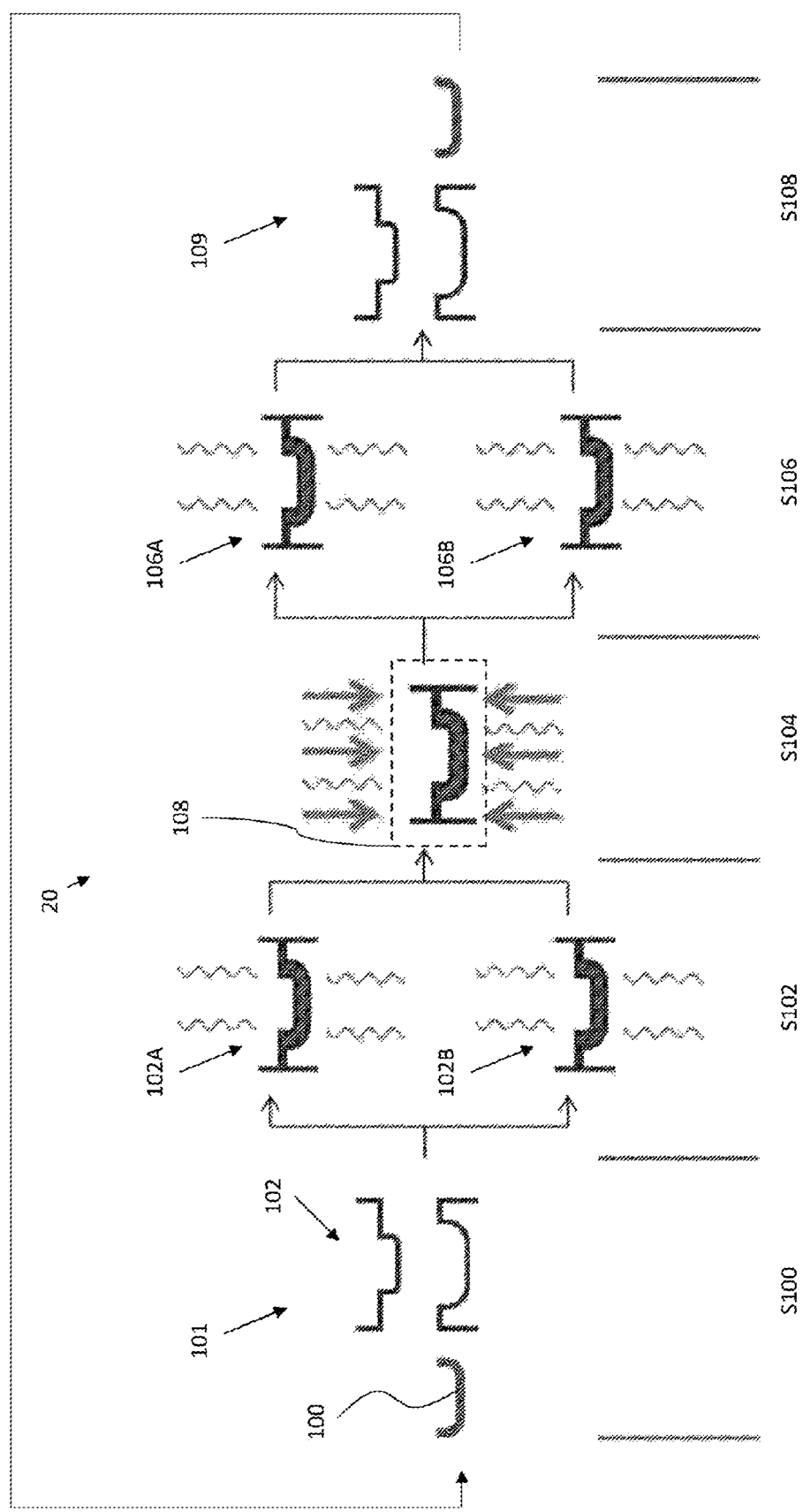
FIG. 2 is a second method in accordance with the present invention.

Turning to FIGS. 1a and 1b, a method 10 comprising a sequence of events S100, S102 etc according to the present invention is depicted. The times at which the events S100, S102 etc are carried out are represented by times T100, T102 etc in FIG. 1b. At time T100, material to be moulded is provided in the form of an unmoulded workpiece 100, which is inserted into a mould layer assembly 102 comprising a first mould layer 104 and a second mould layer 106 at step S100.

Step S102 is carried out at time T102, the mould layer assembly 104 including the workpiece 100 is pre-heated from ambient temperature to temperature TP1. Pre-heating is carried out by relatively simple heating means, in this instance a set of infra-red heating lamps (not shown), which heat the assembly homogenously.

At time T104, a fine control step S104 is carried out in which the mould tool assembly 102 is inserted into a controllable mould tool 108 (as will be described in more detail below) in which pressure is applied and high accuracy zonal heating and cooling is carried out to manufacture the workpiece 100 to the required specification. This generally occurs between temperatures TP1 and TP2. Further details of this process are contained within the applicant's earlier patent applications as described above.

At time T106, step S106, the mould layer assembly 102 is removed from the tool 108 and cooled homogenously using lower accuracy cooling means (in this example a set of opposed cooling fans—not shown).

At time T108, step S108 is carried out in which the workpiece 100 (now at ambient temperature) is demoulded.

Turning to FIG. 2, a manufacturing system 20 carrying out the sequence of events S100, S102 etc. as described above is depicted. Reference numerals correspond to those in FIG. 1a.

The system comprises various stations connected by a transit system (in this instance a conveyor as known in the art). The transit system is represented by the arrows in FIG. 2.

The first station 101 is a mould-filling station and involves placing the unmoulded workpiece 100 into the mould layer assembly 102 at step S100.

The transit system then moves the mould layer assembly 102 to step S102 where multiple mould layer assemblies are shown being pre-heated simultaneously in pre-heating stations 102A and 102B. The workpieces in the stations 102A and 102B are at different stages of pre-heating—i.e. the workpiece in station 102A is just starting whilst the work piece in station 102B is reaching the end, ready for insertion into the tool 108.

Once pre-heating is complete, the mould layer assembly is moved into the single moulding station comprising the mould tool 108. There, fine control is carried out as described above.

Once fine control is finished, the mould layer assembly is moved by the transit system to one of two post-cooling stations 106A, 106B.

Once post-cooling has been carried out, the transit system moves the mould layer assembly to a de-moulding station 109. The empty mould layer assembly is then returned to the mould filling station 101.

The above system 20 can clearly handle a plurality of mould layer assemblies simultaneously. As shown in FIG. 2, individual mould layer assemblies can be simultaneously pre-heated, moulded and post-cooled. This means that several workpieces can be simultaneously manufactured whilst requiring only one moulding machine 108.

Figure 3:
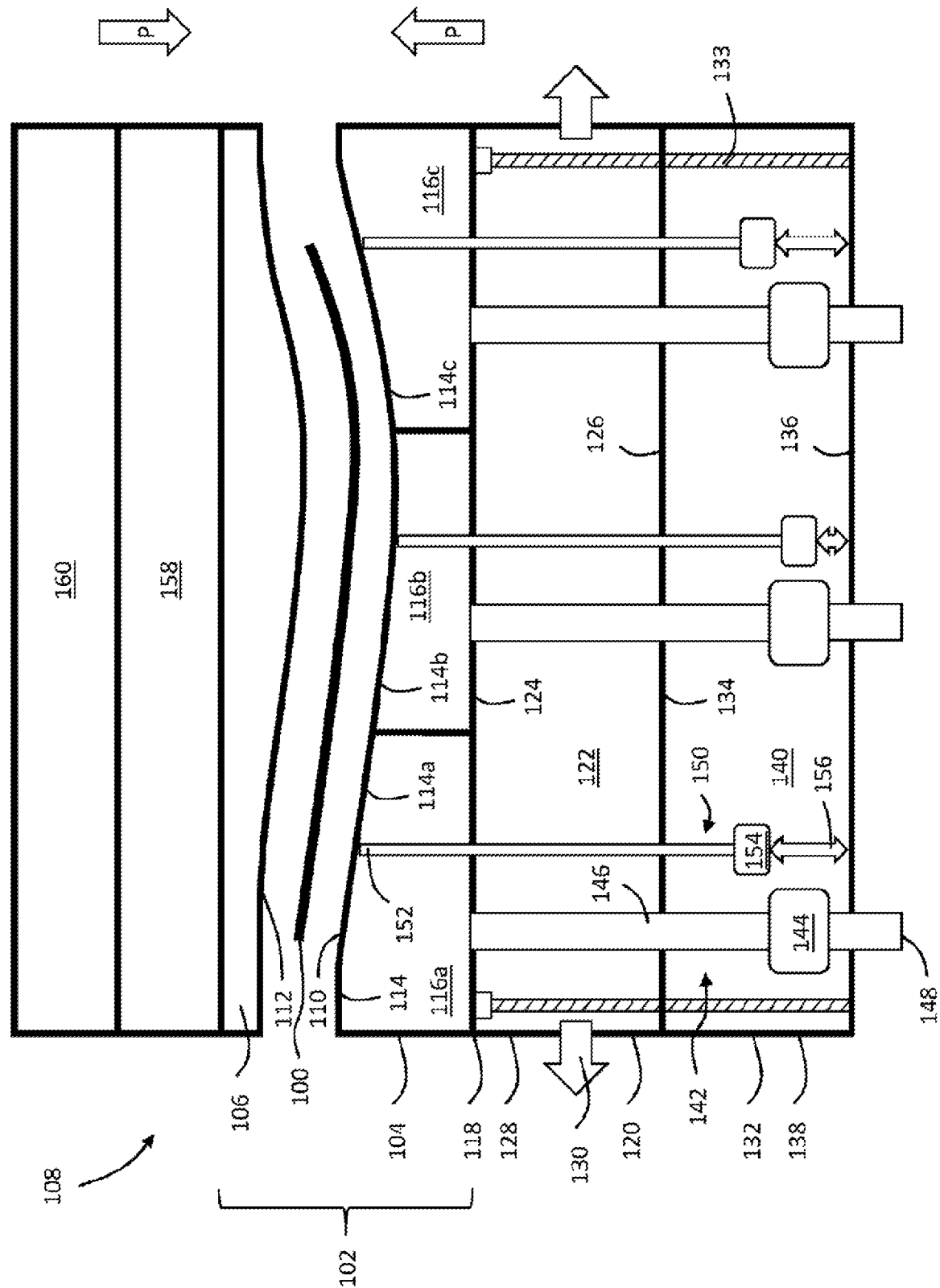
FIG. 3 is a side section view of a first mould tool in accordance with the invention.

FIG. 3 is a detailed view of a mould tool 108 for use in the method described with reference to FIGS. 1a, 1b and 2. The mould tool 108 comprises the first mould layer 104 and the second mould layer 106, forming the mould layer assembly 102 as shown.

The first mould layer 104 defines a first mould layer mould surface 110 which defines a first surface of the workpiece 100 during the moulding operation. The first mould layer defines a temperature control surface 114 opposite the mould surface 110. The temperature control surface 114 is subdivided into a plurality of tessellating, individually temperature controlled zones 114a, 114b, 114c each of which partially bounds a respective fluid chamber 116a, 116b, 116c. The first mould layer 104 has a lower edge 118 opposite the mould surface 110, the lower edge 118 being open to the chambers 116a, 116b, 116c to allow fluid to pass therefrom.

The tool 108 comprises a first exhaust layer 120 having a top surface 124, a bottom surface 126, a series of sidewalls 128 and comprising a fluid chamber 122 therebetween. The exhaust layer is open at the top surface 124, closed at the bottom surface 126 and defines a plurality of exhaust ports 130 in the sidewalls 128.

The tool comprises a first utilities layer 132 having a top surface 134, a bottom surface 136, a series of sidewalls 138 and comprising a utilities chamber 140 therebetween. The top surface 134 of the first utilities later 132 is sealed as will be described below.

The first exhaust layer 120 and the first utilities layer 132 are bolted together with bolts 133. The bolts 133 do not extend into the mould layer 104.

A plurality of first temperature control assemblies 142 are provided, each of which comprises an electric in-line air heater 144 and a fluid conduit 146. The in-line air heater 144 is arranged to heat high pressure air at an inlet 148 thereof before the air passes into the conduit 146. Each first temperature control assembly 142 is configured to selectively provide low flow rate air heated by the heater 144, and alternatively high flow rate air at ambient temperature. It will be understood that the flow rate of the air entering the inlet 148 can be varied from a low flow (for heating) to a high flow (for cooling).

A plurality of first temperature sensors 150 are provided, each of which comprises a thermocouple 152 connected to a terminal 154.

As shown in FIG. 3, a first temperature control assembly 142 and a temperature sensor 150 is provided for each chamber 116a, 116b, 116c. The heater 144 and associated control circuitry is placed within the utilities chamber 140 with the conduit 146 projecting through the upper surface 134 of the first utilities layer 132, through the first exhaust layer 120 to terminate at the interface with chamber 116a, 116b, 116c. The conduits are arranged to project the heating or cooling air onto the respective temperature control surface 114a, 114b, 114c. Once the air has heated or cooled the first mould layer 104, it travels to the first exhaust layer 128 and exits via the ports 130. The first temperature sensors are required to be in contact with the temperature control surface 114 to measure the temperature in each zone. As such, each temperature sensor 150 is resiliently biased towards the temperature control surface 114 with a sprung mount 156 such that the thermocouple 152 is in contact with the surface 114. In this way, different profile first mould layers 104 can be used in the tool 108.

The second mould layer 106 is opposed to the first and defines a second mould layer mould surface 112 which defines a second, opposing, surface of the workpiece 100. As such, the first and second mould layers 104, 106 define a cavity therebetween for the moulding of the workpiece 100. Although shown schematically, the second mould layer 106 is similar in structure and function to the first mould layer 104, and comprises a series of cavities for zonal heating and cooling.

The tool 108 comprises a second exhaust layer 158 and a second utilities layer 160 which have substantially the same structure and function as the first exhaust layer and first utilities layer respectively. They will not be described in detail here. The tool is configured to apply pressure (in direction P) to mould the workpiece 100 whilst selectively heating and cooling areas of the mould layers 104, 106 using zonal temperature control in which the thermocouples 152 provide an input to a control system (not shown) for controlling the heating and cooling supplied by the temperature control assemblies 142.

In the mould tool 108, the first and second mould layers 104, 106 are separable from the tool. As shown in FIG. 4a, the mould layer assembly 102 comprising the layers 104, 106 is primed by insertion of material to be moulded 100 (step S100). In FIG. 4b, the layers 104, 106 are secured together to sandwich the workpiece 100 therebetween. A series of clamps 162 comprising a first part 164 on the first mould layer 104 and a second part 166 on the second mould layer 106 secure the mould layers 104, 106 together (within step S100). In some embodiments, the layers 104, 106 are preloaded, with the clamps 162 holding the preload.

In FIG. 4c, representative of step S102, the clamped assembly 102 is positioned in an electric pre-heater 168 having a first part 170 and a second part 172 for heating the mould layers 104, 106 respectively. Heating is homogenous—in other words the layers 104, 106 are evenly heated to the temperature TP1. Once the workpiece 100 is ready, the clamped assembly 102 moves onto step S104.

Turning to FIGS. 4d to 4e, the start of step S104 is shown. The utilities layers 132, 160 and exhaust layers 120, 158 of the tool are moved away from each other, such that the temperature control assemblies 142 and the temperature sensors 150 are retracted. A receiving area 98 is formed between the exhaust layers. The assembly 102 is then inserted into the tool 108 in direction A until correctly aligned.

As shown in FIG. 4e, the layers can then be moved back into place. As this occurs, the resiliently biased temperature sensors 150 will contact the temperature control surface and be urged downwardly. Once the mould 108 is in this assembled configuration, pressure can be applied in direction P, and fine control of the workpiece curing process can be achieved using the known technique between temperatures TP1 and TP2.

Turning to FIG. 4f, at the end of the step S104 the layers are once again withdrawn, and the assembly 102 containing the workpiece withdrawn from between the exhaust layers. The tool 108 is immediately ready to receive a further mould layer assembly.

Turning to FIG. 4g, in step S106 the mould layer assembly 102 is placed into a cooling device 174 comprising first fan 176 and second fan 178, which are arranged to homogenously and evenly cool the mould layers 104, 106 respectively.

Once the workpiece 100 is cooled to a satisfactory degree, in step S108 the mould layers 104, 106 are unclamped and the cured workpiece 100 removed, as shown in FIG. 4h.

Figure 5B:
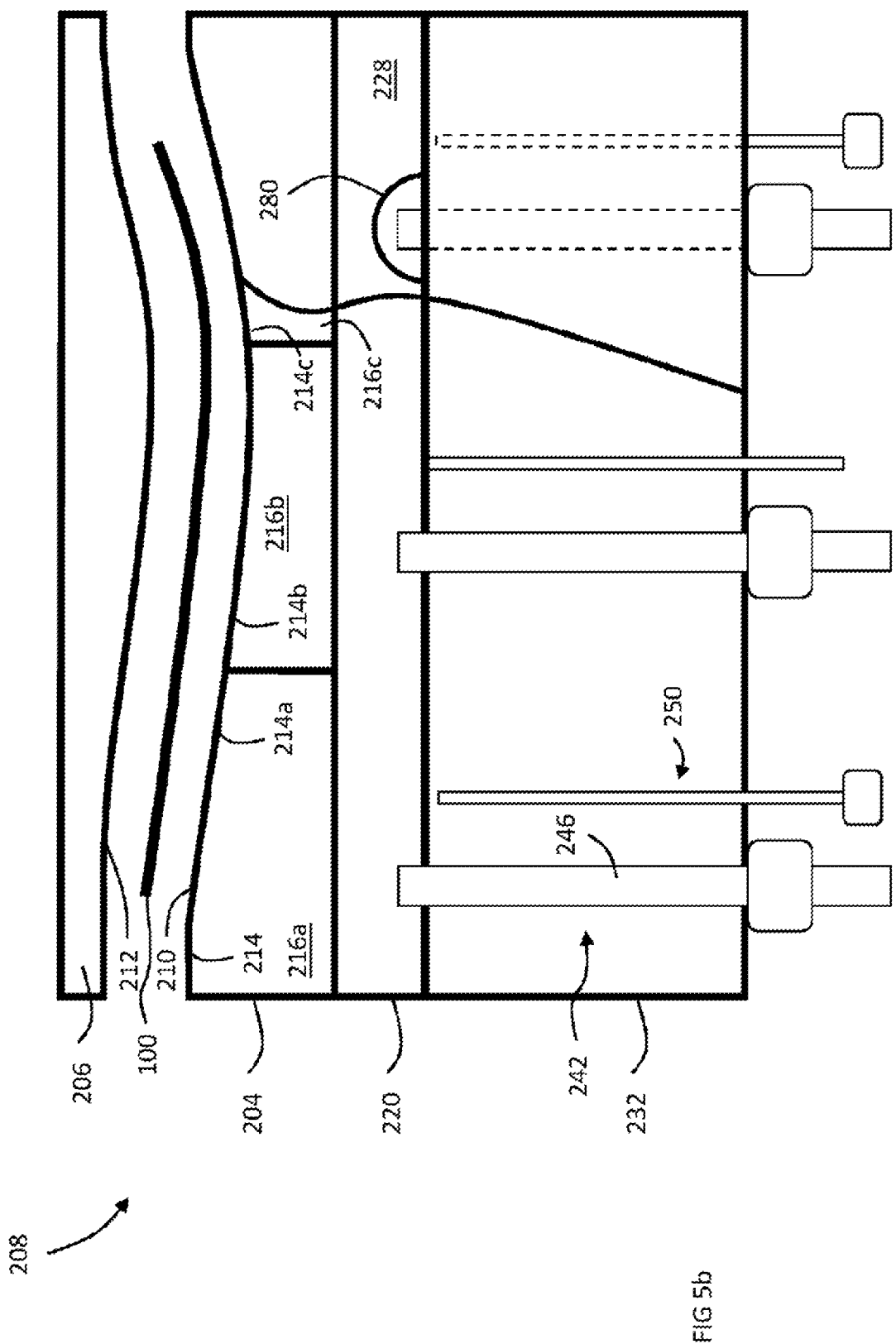

Turning to FIGS. 5a to 5b, a detailed view of an alternative mould tool 208 for use in the method described with reference to FIGS. 1a, 1b and 2. The mould tool 208 comprises a first mould layer 204 and the second mould layer 206 as shown.

The first mould layer 204 comprises a temperature control surface 214 having zones 24a, 214b, 214c and associated fluid chambers 216a, 216b, 216c. The tool 208 comprises a first exhaust layer 220 having a sidewall 228 and a utilities layer 232 per the tool 108. The right hand side of the tool 208 in FIG. 5a is shown from the outside (i.e. not in cross-section). The sidewall 228 of the exhaust layer 220 contains a plurality of cut-outs 280, which extend through the thickness of the exhaust layer 220 (into the page).

The tool comprises temperature control assemblies 242 with conduits 246 and temperature sensors 250.

The tool 208 also comprises associated second exhaust and utilities layers which are not shown for simplicity.

In the tool 208, the mould layer 204 and the exhaust layer 220 are assembled together—that is they are inseparable. A mould layer assembly of the tool 208 would therefore comprise the mould layers 204, 206 and the respective exhaust layers. This makes the assembly stiffer and less prone to deformation for thinner mould layers (it is generally desirable for the mould layers to be thin for thermal agility).

In FIG. 5b, the temperature control assemblies 242 and the temperature sensors 250 have been retracted downwards in the utilities layer 232, away from the exhaust layer 220. The conduits 246 do not quite clear the exhaust layer 220, but do allow the exhaust layer 220 and the mould layer 204 to be withdrawn out of the page due to the presence of the cut-outs 280. The cut-outs 280 also serve as exhaust ports.

Figure 6A:
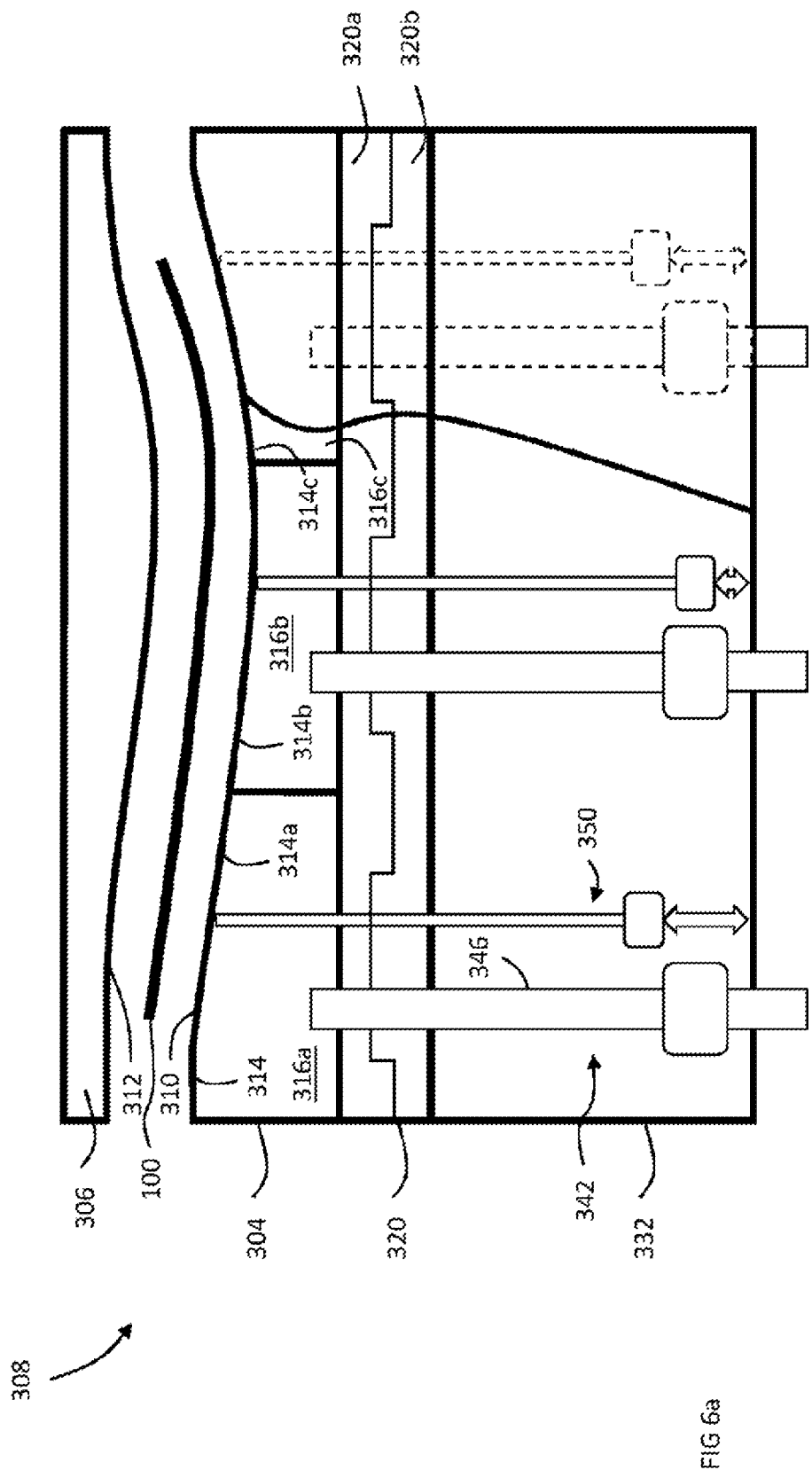

Turning to FIGS. 6a to 6b, a detailed view of an alternative mould tool 308 for use in the method described with reference to FIGS. 1a, 1b and 2. The mould tool 308 comprises a first mould layer 304 and the second mould layer 306 as shown.

The first mould layer 304 comprises a temperature control surface 314 having zones 314a, 314b, 314c and associated fluid chambers 316a, 316b, 316c. The tool 308 comprises a first exhaust layer 320 and a utilities layer 332 per the tool 108. The right hand side of the tool 208 in FIG. 5a is shown from the outside (i.e. not in cross-section).

The tool comprises temperature control assemblies 342 with conduits 346 and temperature sensors 350.

The tool 308 also comprises associated second exhaust and utilities layers which are not shown for simplicity.

The exhaust layer 320 is split into a first part 320a and a second part 320b. The first part 320a is assembled with the mould layer 304, and removable therewith. The second part 320 remains in situ in the tool. The first and second parts 320a, 320b mate together to form an exhaust chamber therebeween.

In FIG. 6b, the utilities layer 342 including the temperature control assemblies 342 and the temperature sensors 350 has been retracted downwards, away from the exhaust layer 320. The conduits 346 do not quite clear the exhaust layer 320, but do allow the exhaust layer 320 and the mould layer 304 to be withdrawn out of the page due to the split between parts 320a and 320b.

Turning to FIGS. 7a to 7c, an alternative mould tool assembly 402 is shown. FIG. 7a shows a perspective view of the mould tool assembly 402, which in this embodiment is surrounded at its periphery by a cassette assembly 460. The mould tool assembly 402 comprising a first mould layer 404 and the second mould layer (not visible) is supported by, and carried in, a carrier in the form of the cassette assembly 460.

The cassette assembly 460 assembly comprises a first cassette part 462 and a second cassette part 464. Each cassette part supports and carries a respective mould layer. The cassette parts 462, 464 are effectively mirror images of each other, and as such only the cassette part 462, and its interaction with the first mould layer 404 will be described here.

The first cassette part 462 defines an outer cassette frame 466 and an inner cassette frame 468. The outer cassette frame 466 comprises a rectangular endless wall 470 having lugs 472 at each corner and midway along each wall 470. Each lug 472 has a bore 474 defined therein. The inner cassette frame 468 comprises a rectangular endless wall 476 having lugs 478 at each corner and midway along two walls 476. Each lug 478 has a bore 480 defined therein. The wall 476 of the inner frame 468 is homothetic with the wall 470 of the outer frame 470.

Between the outer and inner frames 466, 468 there are provided corner support beams 482 and edge support beams 484. The corner support beams 482 extend between corresponding corners of the outer and inner frames, and the edge support beams extend between corresponding edge midpoints of the frame sides.

The first mould layer is mounted within the inner cassette frame 468 and is removably mounted to the lugs 478 thereof by appropriate mechanical fasteners.

As with previous embodiments, the first mould layer 404 comprises a temperature control surface 414 having zones 414a etc and associated fluid chambers 416a etc. The tool mould tool assembly 402 is suitable for use with the aforementioned mould tools.

Referring to FIG. 7b, a part of the wall 476 of the inner cassette frame 468 is shown. A part of a corresponding wall 486 of a corresponding inner frame of the second cassette part 464 is also shown. A stub shaft 488 projects outwardly from the wall 468, and a pin 490 projects outwardly from the wall 486. A fastener in the form of a catch 492 is rotatably mounted to the stub shaft 488.

Referring to FIG. 7c. The catch 492 comprises a planar body 494 defining a mouth 496. The mouth is in the form of an open slot and has a width slightly larger than the diameter of the pin 490. The locus of the mouth has a spiral form—i.e. from the open part of the mouth to the end it moves radially inwardly towards its axis of rotation (i.e. the shaft 488). This can be seen with reference to arc C which is centered on the shaft 488.

The catch 492 is resiliently biased in a rotational sense by a biasing member in the form of a torsion spring (not shown) in an anti-clockwise direction ACW—i.e in the direction of the open mouth 496. In other words, the bias of the spring is to urge the catch 492 such that the pin 490 further enters the mouth 496, and drives the mouth 496 of the catch 492 further over the pin 490. Evidently, the curvature of the locus of the mouth is such that the pin 490 limits the travel of the catch 492. The catch thereby holds the cassette parts 462, 464 (and hence the mould tool parts) together.

It will be noted that if the cassette parts 462, 464 are forced closed together (for example by the pressure of a moulding operation), the pin 490 will move towards the shaft 488, and under the force of the torsion spring (not shown) the catch 492 will rotate in an anti-clockwise fashion ACW. The catch 492 will hold the cassette parts 462, 464 together in the further closed position (retaining a proportion of the clamping force) even when released.

The catch 492 can be undone by applying a force against the bias of the spring in a clockwise direction. This is undertaken in an automated workpiece ejection bay.

It will be noted that a plurality of catches are provided on the cassette parts 462, 464 as shown in FIG. 7a.

The cassette parts 462, 464 are therefore latched together and as a result clamp the mould tool layers together. This is beneficial for mould tool layer transportation between the pre-heating stage, moulding stage, and post-cooling stage. In this way, the cassette parts 462, 464 can be directly handled (by personnel or machine) without risk of damage to the mould layers. The cassette parts 462, 464 can be engaged using pins in the bores 474 of the lugs 472 for location and transport. This distinction between the mould layers and cassette parts allows for the mould layers to be constructed from materials best suited for moulding, and in a material thickness best suited for moulding. The majority of the external forces during transit are taken by the cassette parts, which can be made very sturdy. It will be noted that the cassette parts can accept different mould layers so that it is not necessary for each mould layer to carry features for manipulation by the transport system, or clamping means. The cassette parts also protect the mould layers from external damage.

Turning to FIGS. 8a to 8d, a mould tool assembly 502 is shown comprising a first mould layer 504 having a mould face and a second mould layer 506. The mould layers 502, 504 are being removed from cooling device 574 as described above.

Referring to FIG. 8b, the mould layers 504, 506 have been separated, and it is desirable to eject a workpiece 500. Turning to FIGS. 8c and 8d, the area c/d of FIG. 8b is shown in detail.

The first mould layer 504 comprises an integral ejector pin 600. The ejector pin 600 is assembled with the layer 504 and defines part of the mould face 510. The ejector pin 600 is biased into the position in FIG. 8c where the pin is flush with the mould face 510. The ejector pin 600 is biased by a spring 604. When the mould layers 504, 506 are separated in an ejection station, an ejector pin actuator 602 is introduced to the side of the pin opposite the mould face 510 and advanced such that the pin stands proud of the mould face 510 to eject the workpiece 500. This is shown in FIG. 8d.

It will be noted that because the pin 600 defines part of the mould face, it is integral with the mould layer 504.

Turning to FIGS. 9a to 9i, an alternative mould tool assembly 702 is shown. FIG. 7a shows a perspective view of the mould tool assembly 702, which in this embodiment is surrounded at its periphery by a cassette assembly 760. The mould tool assembly 702 comprising a first mould layer 704 and the second mould layer 706 (not visible) is supported by, and carried in, the cassette assembly 760.

The cassette assembly 760 directly supports the first mould layer 704. The cassette assembly 760 defines a cassette frame 766. The cassette frame 766 comprises a rectangular endless wall 770 having lugs 772 at each corner.

Each lug 772 has a bore 774 defined therein. An inwardly projecting flange 771 extends inwardly of the wall 770 around its periphery.

The first mould layer 704 is mounted within, and contained within the periphery of, the cassette frame 766.

As with previous embodiments, the first mould layer 704 comprises a temperature control surface having zones etc and associated fluid chambers 705 opposite a mould face 714. The mould layer assembly 702 is suitable for use with the aforementioned mould tools.

Figure 9A:
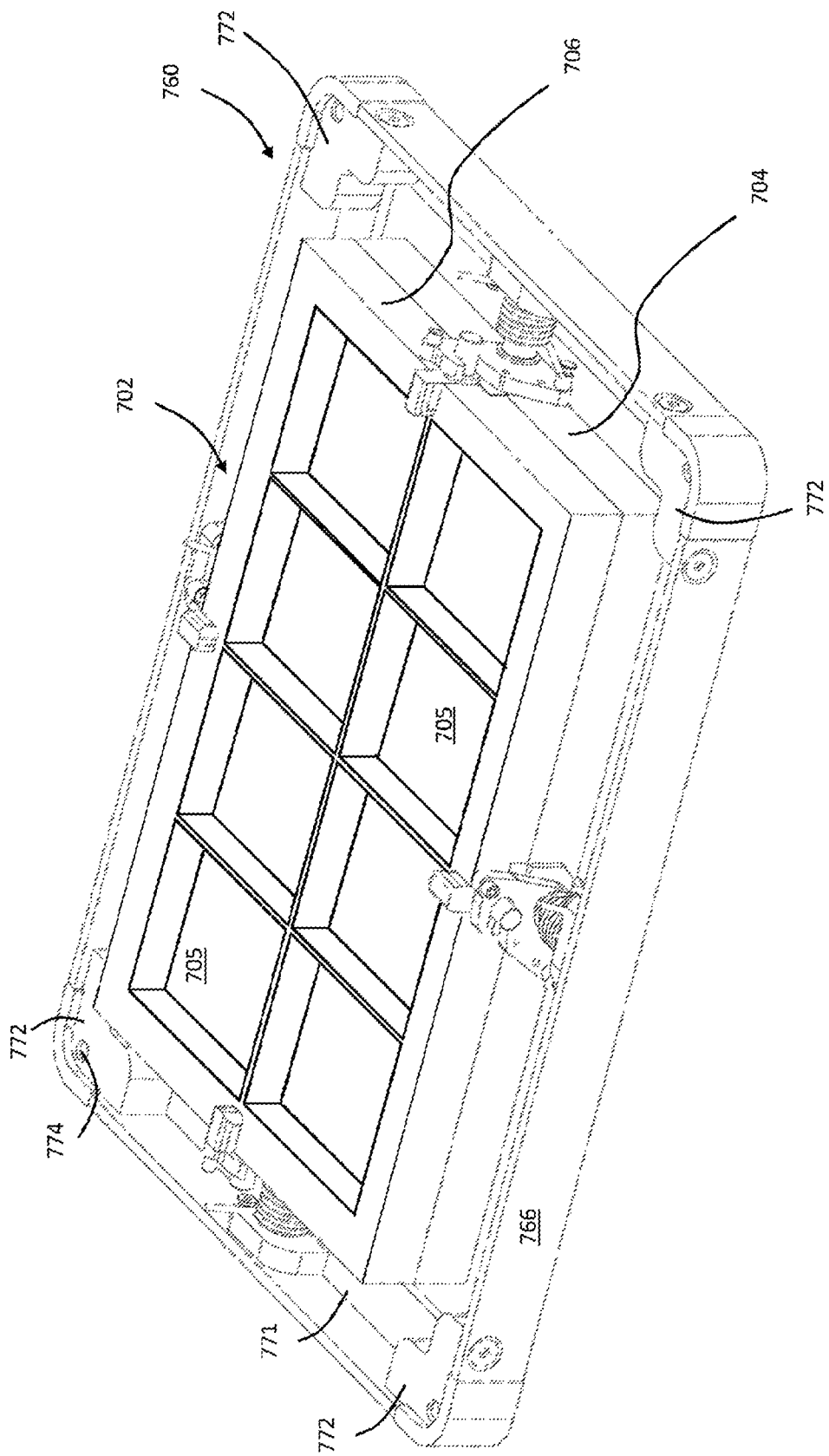
FIGS. 9a and 9b show perspective views of parts of a fifth mould tool in accordance with the present invention.
Figure 9B:
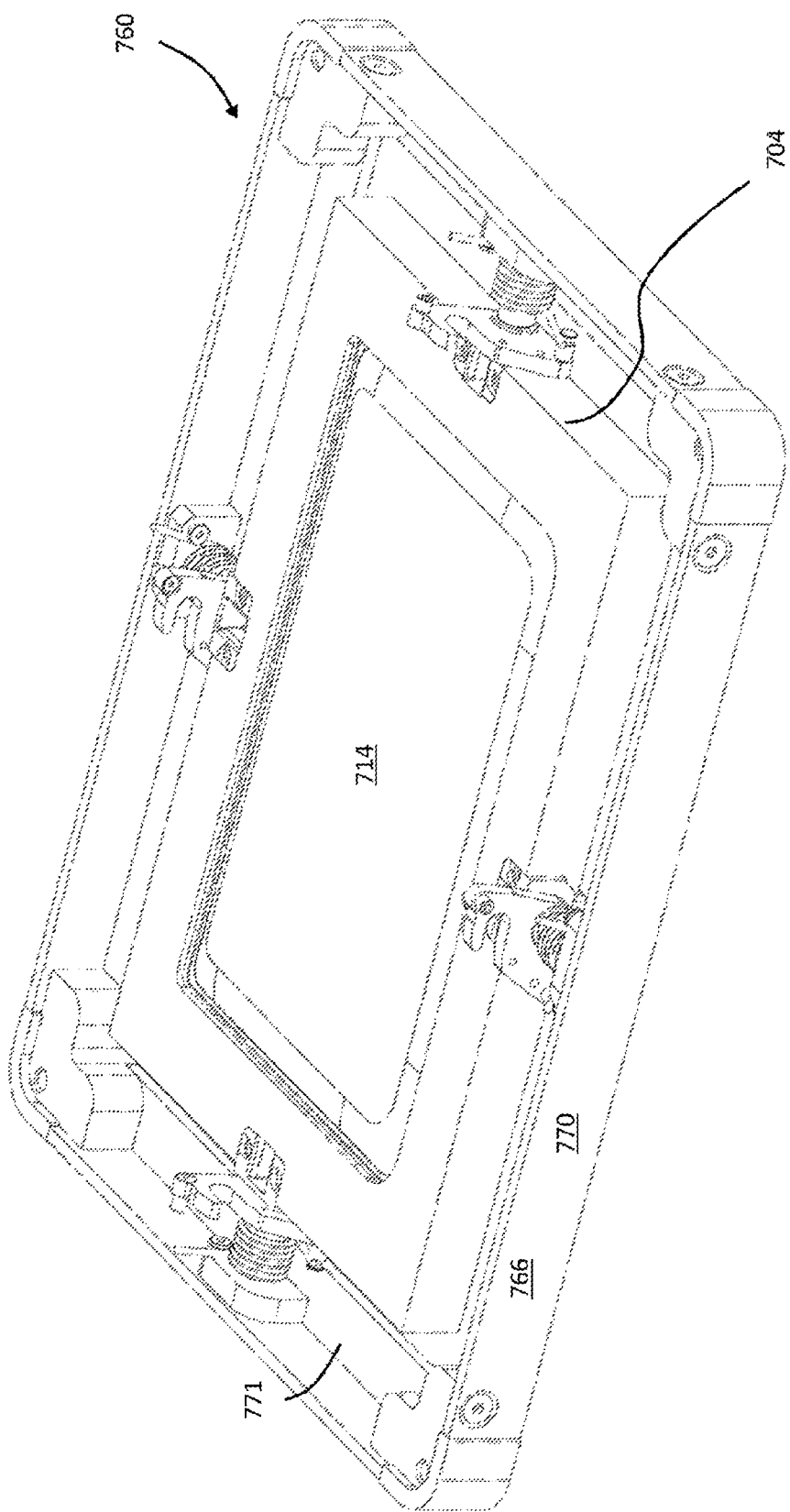
Figure 9C:
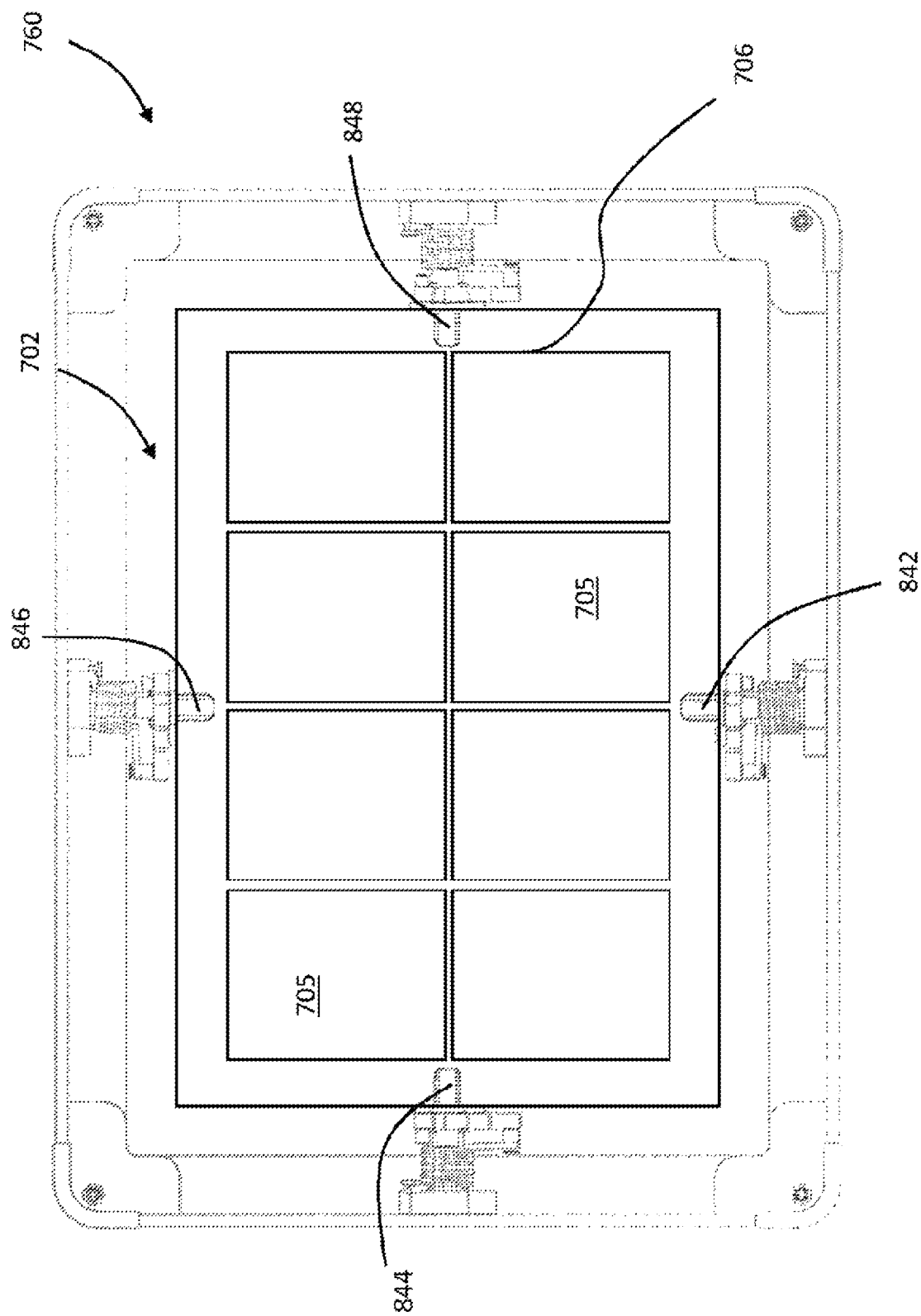
Figure 9D:
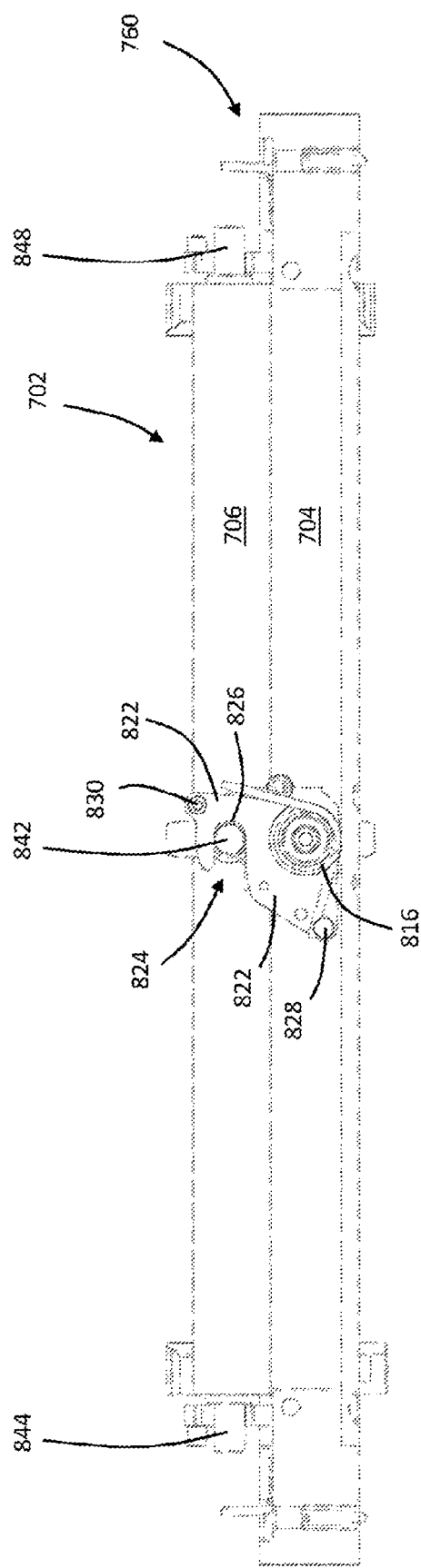
Figure 9E:
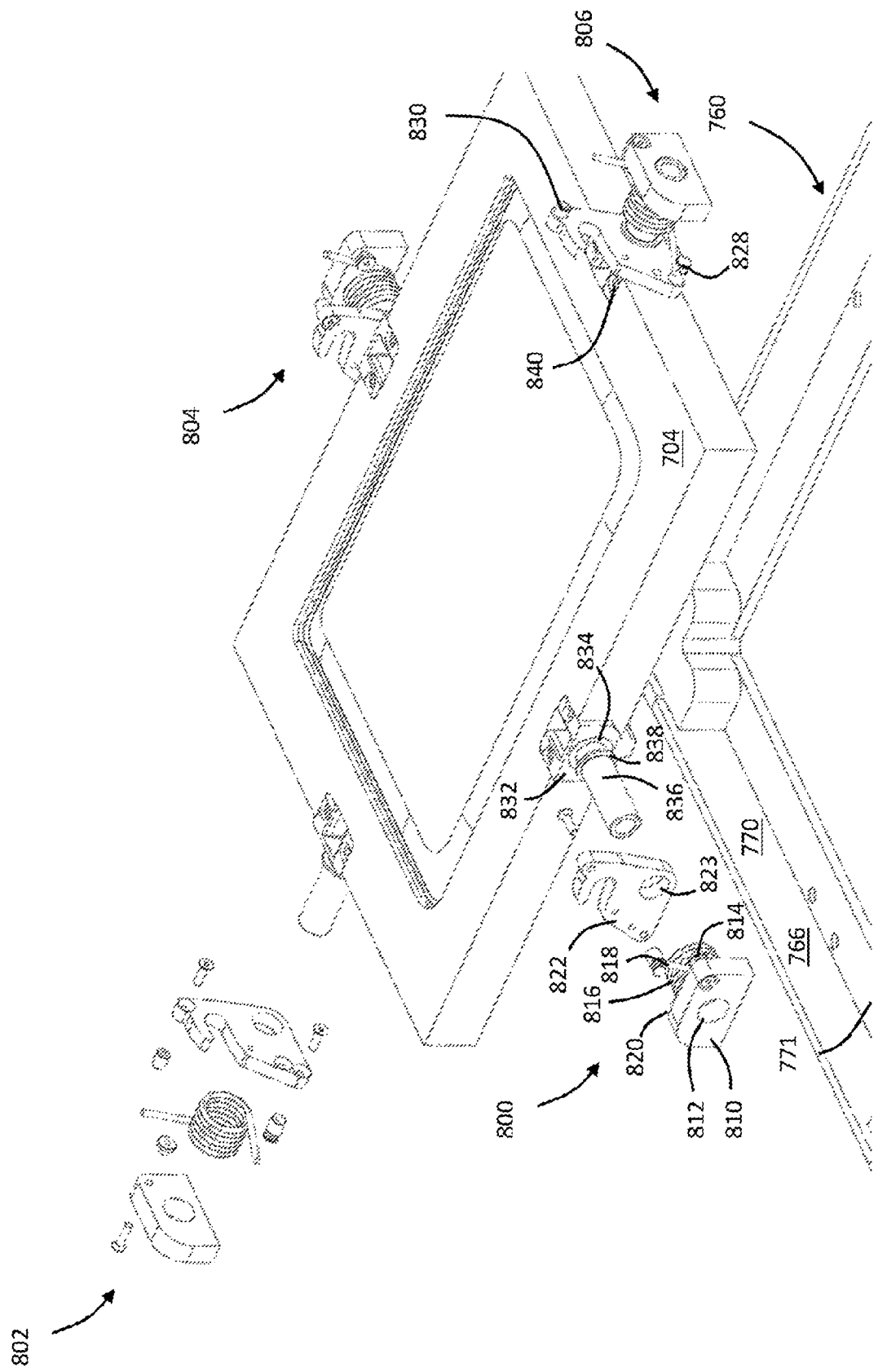

Referring to FIG. 9e, there are provided four clamp assemblies 800, 802, 804, 806 which connect the cassette frame 766 and the first mould layer 704. The clamp assemblies 800, 802, 804, 806 are positioned at the midpoint of each of the four sides of the generally rectangular mould layer 704.

The clamp assembly 800 will be described in detail here, although it will be understood that the clamp assemblies 802, 804, 806 are identical.

The clamp assembly 800 comprises a cassette mount 810 comprising a body with a central circular bore 812. Offset from the bore 812 there is provided a spring abutment pin 814 which projects from the mount 810.

The clamp assembly further comprises a torsion spring 816 which is generally wound in a helix, having a first tangentially extending free end 818 and a second tangentially extending free end 820.

A catch 822 (FIG. 9f) is provided comprising a generally flat body. The catch 822 defines an open mouth 824 having an end abutment region 826. The catch comprises a spring abutment pin 828 and an actuator pin 830 extending perpendicularly therefrom (shown on clamp assembly 806 in FIG. 9e). The catch 822 also defines an open bore 823.

The geometry of the mouth 824 is explained with reference to FIG. 9f. The mouth 824 comprises a curved, radially inwardly facing surface 825. Using the centre of the bore 823 (which as described below is the centre of rotation of the catch 822) as a reference axis X, the entry point of the mouth is at angle A1 and radial distance R1. Moving further into the mouth 824 (i.e. as the angle increases), the radial distance of the surface 825 decreases (i.e. moves closer to the axis X). At angle A2 (>A1), the radial position R2<R1. In other words, the surface 825 is shaped as a spiral—in polar coordinates using X as the origin R is proportional to −A.

The clamp assembly 800 further comprises a mould layer mount 832 comprising a body with a central circular bore 834.

A cylindrical clamp shaft 836 is also provided having a catch retaining flange 838.

Referring to the assembled clamp assembly 800 shown in FIG. 9d, and the clamp assembly 806 shown in FIG. 9e, the mould layer mount 832 is attached to the first mould layer 704 in a corresponding recess by mechanical fasteners 840. The mould layer mount projects slightly from the mould layer 704. The bore 823 of the catch 822 is aligned with the bore 834 in the mould layer mount 832 and the clamp shaft 836 inserted into the bores 823, 834 with the flange 838 holding the catch 822 in abutment with the mould layer mount 832. The catch 822 can rotate about the clamp shaft 836.

The torsion spring 816 is threaded onto the clamp shaft 836 such that the free end 820 abuts the spring abutment pin 828 on the catch 822. The cassette mount 810 is also threaded onto the clamp shaft 836 (via bore 812) such that the free end 818 of the torsion spring 816 abuts the spring abutment pin 814. The cassette mount 810 is attached to the cassette (specifically onto flange 771).

Once assembled, the catch (with reference to FIG. 9d) is biased by the spring 816 in the direction of opening of the mouth 824. In FIG. 9d, this is anti-clockwise.

Referring to FIGS. 9c and 9d, the second mould layer 706 comprises stub shafts 842, 844, 846, 888 which project outwardly therefrom.

The first and second mould layers 704, 706 are assembled by placing material on the first mould layer 704 as described above. The catches 822 are simultaneously rotated against the bias of the springs 816 by applying a force to the actuator pins 830. The second mould layer 706 is lowered to compress the material between the mould layers 704, 706 and the catches 822 released. As the catches 822 resile under the bias of the springs 816 they catch the stub shafts 842 in the mouth 824 (see FIG. 9d) to hold the layers 704, 706 together.

As with the mould layer assembly 402, the catches 822 are designed to at least partially retain any clamping force applied to the mould layers 702.

Figure 9I:
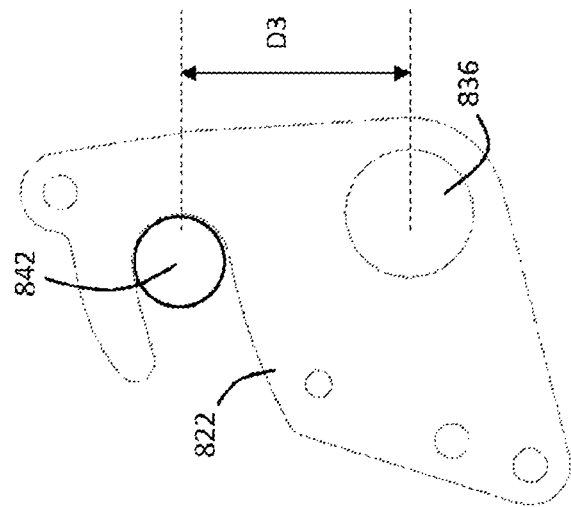
FIGS. 9g to 9i are steps in the operation of the part of FIG. 9f.
Figure 9H:
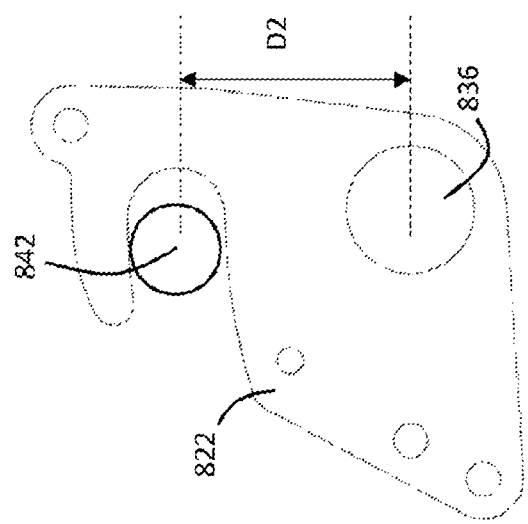
Figure 9G:
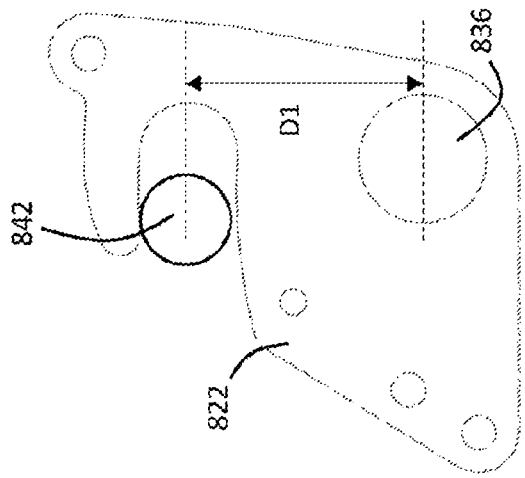

Referring to FIG. 9g, a small clamping force between the mould layers 704, 706 results in a distance D1 between the centres of the stub shaft 842 and the clamp shaft 836. The catch 822 rotates under the bias of the spring 816 such that the surface 825 in abutment with the stub shaft 842 prevents further rotation. This level of compression may occur during pre-heating, and may be in the order of kg.

As the mould layer assembly 702 is passed to the moulding machine a higher degree of clamping force is applied in the order of tens of tons. As this occurs the stub shaft 842 and the clamp shaft 836 move closer to reduce D1 to D2 and eventually D3. As this occurs, because of the shape of the spiral surface 825, the catch rotates under the bias of the spring 816 to further engage the stub shaft 842 into the mouth 824 as shown in FIGS. 9h and 9i. Once the clamping pressure is released, the catch remains in position (the spiral mouth 824 creates a "self-tightening" effect). Due to the natural extensibility of the parts, it is understood that the clamping force is not retained in its entirety, but a significant proportion thereof will be.

This is beneficial for post-cooling, as the part within the mould cannot deflect during transfer to the post-cooling station. Therefore the part can be cooled within the mould layers, reducing deflection when de-moulded.

Variations fall within the scope of the present invention.

The workpiece material may be any suitable engineering material which responds to heat treatment during moulding.

The pre-heating phase may be undertaken by directing exhaust 130 from the mould tool 108 (which typically exhausts hot air) into the fluid chambers 116a etc. of the mould layer assembly 102. This is an efficient use of otherwise unused heat from the moulding process.

The invention claimed is:

1. A method of manufacturing a moulded workpiece comprising:
    providing a mould tool having a temperature control system, the temperature control system comprising a plurality of temperature control apparatuses configured to selectively control the temperature of a plurality of tessellating individually temperature controlled mould tool zones on a mould surface;
    providing a mould layer assembly that is separable from the mould tool and that comprises:
        a first mould layer defining a first mould surface and a second mould layer defining a second mould surface opposite the first mould surface to define a mould cavity therebetween;

a series of fluid chambers opposite the first mould surface, which fluid chambers define the plurality of tessellating individually temperature controlled mould tool zones; and, a clamping mechanism that is configured to retain at least part of a pressure exerted on the first mould layer and the second mould layer;

introducing material to be moulded into the mould cavity of the mould layer assembly;

applying a moulding pressure to the mould layer assembly;

using the temperature control system to undertake part of a moulding operation by selectively controlling the temperature of the plurality of tessellating individually temperature controlled mould tool zones on the first mould surface of the mould layer assembly;

removing the mould layer assembly from the mould tool while retaining at least part of the moulding pressure between the first mould layer and the second mould layer with the clamping mechanism during transit of the mould layer assembly; and, removing the moulded workpiece from the mould layer assembly;

wherein the method comprises one or more of a pre-heating stage and a post-cooling stage wherein:

the pre-heating stage comprises the steps of pre-heating the mould layer assembly outside the mould tool before inserting the mould layer assembly into the mould tool; and, the post-cooling stage comprises the steps of removing the mould layer assembly from the mould tool and cooling the mould layer assembly outside the mould tool.

2. A method of manufacturing a moulded workpiece according to claim 1, wherein the method comprises both the pre-heating and post-cooling stage.

3. A method of manufacturing a moulded workpiece according to claim 1, wherein the plurality of temperature control apparatuses each comprises a fluid outlet directed at respective tessellating individually temperature controlled mould tool zones when the mould layer assembly is in the mould tool.

4. A method of manufacturing a moulded workpiece according to claim 3, wherein one of more of the fluid outlets is directed into each fluid chamber to control the temperature of the first mould surface.

5. A method of manufacturing a moulded workpiece according to claim 4, wherein the mould layer assembly is preheated or post-cooled with fluid passed into the fluid chambers.

6. The method of manufacturing a moulded workpiece according to claim 3, wherein each of the plurality of temperature control apparatuses is configured to selectively provide low flow rate air heated by a heater and alternatively high flow rate air at ambient temperature to respectively heat and cool respective tessellating individually temperature controlled mould tool zones when the mould layer assembly is in the mould tool.

7. A method of manufacturing a moulded workpiece according to claim 1, further comprising:

advancing the plurality of temperature control apparatuses towards the mould layer assembly before undertaking the moulding operation; and, retracting the plurality of temperature control apparatuses away from the mould layer assembly before removing the mould layer assembly.

8. A method of manufacturing a moulded workpiece according to claim 7, wherein the plurality of temperature control assemblies are movable towards and away from the mould layer assembly in a first direction, and wherein the mould layer assembly is insertable and removable in a second direction perpendicular to the first.

9. A method of manufacturing a moulded workpiece according to claim 1, further comprising:

applying a preload to the mould layer assembly to exert an out-of-mould pressure on the workpiece.

10. A method of manufacturing a moulded workpiece according to claim 9 wherein the moulding pressure is greater than the out-of-mould pressure.

11. A method of manufacturing a moulded workpiece according to claim 1, further comprising:

providing a cassette;

removably mounting the mould layer assembly to the cassette; and transporting the mould layer assembly using the cassette.

12. A method of manufacturing a moulded workpiece according to claim 1, wherein the temperature control apparatuses comprise components resiliently biased into contact with the first mould layer.

13. A method of manufacturing a moulded workpiece according to claim 1, wherein the components of the temperature control apparatuses resiliently biased into contact with the first mould layer comprise temperature sensors.

14. A method of manufacturing a moulded workpiece according to claim 1, wherein pre-heating comprises evenly heating the mould layer assembly to a substantially even temperature across the first mould surface.

15. A method of manufacturing a moulded workpiece according to claim 1, wherein the plurality of temperature control apparatuses are mounted to a utilities layer comprising at least one of power and control wiring.

16. A method of manufacturing a moulded workpiece according to claim 15, further comprising moving the utilities layer away from the mould layer assembly to retract the plurality of temperature control apparatuses.

17. A method of manufacturing a moulded workpiece according to claim 16, wherein the clamping mechanism comprises a catch.

18. A method of manufacturing a moulded workpiece according to claim 17, wherein the catch is a variable catch configured to at least partially maintain an applied clamping force between the first and second mould layers.

* * * * *